US011187168B2

(12) United States Patent
Puntambekar et al.

(10) Patent No.: US 11,187,168 B2
(45) Date of Patent: Nov. 30, 2021

(54) SYSTEMS AND METHODS FOR INCREASING ENGINE POWER OUTPUT UNDER GLOBALLY STOICHIOMETRIC OPERATION

(71) Applicant: Ford Global Technologies, LLC, Dearborn, MI (US)

(72) Inventors: Aakash Puntambekar, Canton, MI (US); Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/559,476

(22) Filed: Sep. 3, 2019

(65) Prior Publication Data
US 2021/0062741 A1 Mar. 4, 2021

(51) Int. Cl.
*F02D 41/00* (2006.01)
*F02D 41/14* (2006.01)
(Continued)

(52) U.S. Cl.
CPC ....... *F02D 41/0052* (2013.01); *F02D 41/005* (2013.01); *F02D 41/0007* (2013.01);
(Continued)

(58) Field of Classification Search
CPC ............ F02D 41/0007; F02D 41/0008; F02D 41/0082; F02D 41/005; F02D 41/0052;
(Continued)

(56) References Cited

U.S. PATENT DOCUMENTS 5,657,625 A * 8/1997 Koga .................... F01N 3/20
60/274
7,975,471 B2 7/2011 Miyashita
(Continued)

FOREIGN PATENT DOCUMENTS

FR 3052498 A1 * 12/2017 ............. F02D 41/18

OTHER PUBLICATIONS

Puntambekar, A., "Systems and Methods for Increasing Engine Power Output Under Globally Stoichiometric Operation," U.S. Appl. No. 16/559,448, filed Sep. 3, 2019, 74 pages.
(Continued)

*Primary Examiner* — John M Zaleskas
(74) *Attorney, Agent, or Firm* — Geoffrey Brumbaugh; McCoy Russell LLP

(57) ABSTRACT

Methods and systems are provided for increasing engine power while reducing vehicle emissions and engine system degradation. In one example, a method may include, responsive to an engine load reaching a threshold load, increasing engine torque by increasing an amount of boost without providing exhaust gas recirculation (EGR), and, responsive to the engine torque reaching a first threshold torque, increasing the engine torque by increasing an EGR rate over a plurality of engine cycles while further increasing the amount of boost. In this way, cooling effects from the EGR enable engine air flow, and thus engine power, to be increased while engine vibrations and heat-related exhaust component degradation are decreased.

19 Claims, 7 Drawing Sheets

(51) Int. Cl.
*F02D 41/04* (2006.01)
*F02P 5/15* (2006.01)

(52) U.S. Cl.
CPC ....... *F02D 41/008* (2013.01); *F02D 41/0065* (2013.01); *F02D 41/047* (2013.01); *F02D 41/1475* (2013.01); *F02P 5/1512* (2013.01); *F02P 5/1516* (2013.01)

(58) Field of Classification Search
CPC ............. F02D 41/0065; F02D 41/0085; F02D 41/1475; F02M 26/05
See application file for complete search history.

(56) References Cited

U.S. PATENT DOCUMENTS

| | | | |
|---|---|---|---|
| 8,838,365 B2 | 9/2014 | Glugla et al. | |
| 9,988,994 B2 | 6/2018 | Leone et al. | |
| 10,174,699 B2 | 1/2019 | Suzuki et al. | |
| 10,871,140 B1* | 12/2020 | Christensen | F02D 41/0082 |
| 2004/0061290 A1* | 4/2004 | Gray, Jr. | F02B 1/12 |
| | | | 277/411 |
| 2004/0187481 A1* | 9/2004 | Elwart | F01N 13/0097 |
| | | | 60/285 |
| 2004/0250534 A1* | 12/2004 | Tanaka | F02D 41/1408 |
| | | | 60/284 |
| 2005/0171670 A1* | 8/2005 | Yoshioka | F02D 41/10 |
| | | | 701/54 |
| 2005/0241299 A1* | 11/2005 | Brown | F02D 41/0082 |
| | | | 60/286 |
| 2005/0284132 A1* | 12/2005 | Makki | F01N 3/0842 |
| | | | 60/285 |
| 2007/0039598 A1* | 2/2007 | Wakayama | F02D 41/0027 |
| | | | 123/568.21 |
| 2007/0089415 A1* | 4/2007 | Shimokawa | F02B 37/00 |
| | | | 60/605.2 |
| 2007/0113541 A1* | 5/2007 | Jankovic | F01N 13/009 |
| | | | 60/285 |
| 2007/0267002 A1* | 11/2007 | Schmid | F02B 37/02 |
| | | | 123/568.17 |
| 2007/0289295 A1* | 12/2007 | Miyashita | F01N 3/0842 |
| | | | 60/300 |
| 2009/0308070 A1* | 12/2009 | Alger, II | F02D 13/0238 |
| | | | 60/602 |
| 2010/0024399 A1* | 2/2010 | Demura | F01N 3/2053 |
| | | | 60/285 |
| 2010/0037594 A1* | 2/2010 | Demura | F02D 41/008 |
| | | | 60/285 |
| 2011/0067397 A1* | 3/2011 | Hirth | F02M 26/05 |
| | | | 60/602 |
| 2011/0167815 A1* | 7/2011 | Ulrey | F02M 35/112 |
| | | | 60/602 |
| 2011/0265762 A1* | 11/2011 | Lorenz | F02P 5/1528 |
| | | | 123/406.45 |
| 2011/0289904 A1* | 12/2011 | Miyashita | F02D 41/126 |
| | | | 60/278 |
| 2012/0323470 A1* | 12/2012 | Klingbeil | F02D 41/405 |
| | | | 701/108 |
| 2013/0000614 A1* | 1/2013 | Freund | F02D 41/0077 |
| | | | 123/568.2 |
| 2013/0247715 A1* | 9/2013 | Hayman | F16C 3/06 |
| | | | 74/596 |
| 2014/0053553 A1* | 2/2014 | Wolk | F02B 37/162 |
| | | | 60/605.2 |
| 2014/0190458 A1* | 7/2014 | Gingrich | F02D 41/005 |
| | | | 123/568.2 |
| 2014/0196697 A1* | 7/2014 | Burrahm | F02M 26/35 |
| | | | 123/568.11 |
| 2014/0214302 A1* | 7/2014 | Parikh | F02M 26/44 |
| | | | 701/101 |
| 2014/0261322 A1* | 9/2014 | Geckler | F02D 41/0025 |
| | | | 123/445 |
| 2014/0352661 A1* | 12/2014 | Glugla | F02B 29/0468 |
| | | | 123/406.19 |
| 2014/0352663 A1* | 12/2014 | Glugla | F02B 29/0468 |
| | | | 123/443 |
| 2015/0047347 A1* | 2/2015 | Ulrey | F02M 26/06 |
| | | | 60/605.2 |
| 2015/0053177 A1* | 2/2015 | Wooldridge | F02D 41/005 |
| | | | 123/406.3 |
| 2015/0057911 A1* | 2/2015 | Wooldridge | F02D 41/005 |
| | | | 701/108 |
| 2015/0101564 A1* | 4/2015 | Surnilla | F02D 41/1441 |
| | | | 123/294 |
| 2015/0114341 A1* | 4/2015 | Geckler | F02D 41/06 |
| | | | 123/295 |
| 2015/0121862 A1* | 5/2015 | Wade | F02B 37/02 |
| | | | 60/602 |
| 2015/0176513 A1* | 6/2015 | Lana | F02D 41/008 |
| | | | 123/406.48 |
| 2015/0240706 A1* | 8/2015 | Yamagata | F02P 15/02 |
| | | | 60/603 |
| 2015/0285160 A1* | 10/2015 | Zhang | F02D 41/0002 |
| | | | 60/602 |
| 2015/0292429 A1* | 10/2015 | Surnilla | F01M 13/00 |
| | | | 701/108 |
| 2015/0308364 A1* | 10/2015 | Hojo | F02D 41/1439 |
| | | | 60/285 |
| 2015/0322904 A1* | 11/2015 | Leone | F02D 41/005 |
| | | | 701/104 |
| 2015/0337696 A1* | 11/2015 | Glugla | F02D 21/08 |
| | | | 123/574 |
| 2015/0354477 A1* | 12/2015 | Leone | F02D 41/0065 |
| | | | 123/406.26 |
| 2015/0361927 A1* | 12/2015 | Glugla | F02D 13/0261 |
| | | | 60/603 |
| 2016/0003196 A1* | 1/2016 | Hang | F02B 37/025 |
| | | | 60/605.2 |
| 2016/0025021 A1* | 1/2016 | Hilditch | F02D 41/0052 |
| | | | 60/274 |
| 2016/0040589 A1* | 2/2016 | Glugla | F02M 26/43 |
| | | | 60/278 |
| 2016/0040607 A1* | 2/2016 | Ku | F02D 41/008 |
| | | | 123/568.17 |
| 2016/0047326 A1* | 2/2016 | Geckler | F02M 26/02 |
| | | | 60/602 |
| 2016/0053729 A1* | 2/2016 | Geckler | F02D 41/0025 |
| | | | 123/445 |
| 2016/0102636 A1* | 4/2016 | Styles | F02D 41/006 |
| | | | 123/568.21 |
| 2016/0131056 A1* | 5/2016 | Henry | F02D 41/0082 |
| | | | 60/274 |
| 2016/0230712 A1* | 8/2016 | Akinyemi | F01N 13/107 |
| 2017/0051658 A1* | 2/2017 | Glugla | F02B 29/04 |
| 2017/0130645 A1* | 5/2017 | Tennison | F02D 41/024 |
| 2017/0130660 A1* | 5/2017 | Gates | F02P 5/15 |
| 2017/0159525 A1* | 6/2017 | Backhaus | F02D 35/028 |
| 2017/0204797 A1* | 7/2017 | Geckler | F02M 26/44 |
| 2017/0314489 A1* | 11/2017 | Suzuki | F01N 3/101 |
| 2017/0363057 A1* | 12/2017 | Gukelberger | F02M 26/43 |
| 2018/0003114 A1* | 1/2018 | Gates | F02D 41/0077 |
| 2018/0180016 A1* | 6/2018 | Nose | F02P 5/1514 |
| 2018/0245530 A1* | 8/2018 | Gates | F02M 26/43 |
| 2018/0291823 A1* | 10/2018 | Hellstrom | F02D 41/0052 |
| 2019/0024574 A1* | 1/2019 | Upadhyay | F04D 29/4213 |
| 2019/0024576 A1* | 1/2019 | Van Nieuwstadt | F04D 29/4213 |
| 2019/0277188 A1* | 9/2019 | Zeng | F02D 41/0072 |
| 2020/0318564 A1* | 10/2020 | Stroh | F02M 26/01 |

(56) References Cited

U.S. PATENT DOCUMENTS

2021/0062745 A1* 3/2021 Russ ................. F02P 5/045
2021/0062748 A1* 3/2021 Puntambekar ........ F02D 41/005

OTHER PUBLICATIONS

Russ, S. et al., "Systems and Methods for Increasing Engine Power Output Under Globally Stoichiometric Operation," U.S. Appl. No. 16/559,463, filed Sep. 3, 2019, 75 pages.

* cited by examiner

SYSTEMS AND METHODS FOR INCREASING ENGINE POWER OUTPUT UNDER GLOBALLY STOICHIOMETRIC OPERATION

FIELD

The present description relates generally to methods and systems for controlling a vehicle engine to increase power output via exhaust gas recirculation and air-fuel ratio adjustments.

BACKGROUND/SUMMARY

A typical spark ignition engine of a vehicle operates at stoichiometry during most operating conditions, where it is supplied with just enough fuel to react with an amount of air consumed by the engine. Operating at stoichiometry increases an efficiency of a three-way catalyst positioned in an exhaust system of the engine, thereby reducing vehicle emissions. In general, higher cylinder air charges increase engine power, and so some engines are equipped with a turbocharger to harness heat from the exhaust gas to supply more air to the engine to increase engine power. However, increasing engine air flow increases exhaust system component temperature, including a temperature of a turbine of the turbocharger and a temperature of the three-way catalyst. Such temperature increases may degrade the turbine and the three-way catalyst, for example.

Therefore, typical spark ignition engines may employ a global enrichment strategy to increase engine power, where more fuel is supplied than for a complete reaction with the amount of air consumed by the engine. In particular, the additional, unreacted fuel cools exhaust system components, including the turbine and the three-way catalyst. This enables more air flow for increased power while reducing heat-related degradation to the downstream components compared with operating at stoichiometry. However, deviating from stoichiometry decreases an efficiency of the three-way catalyst, resulting in increased vehicle emissions.

The inventors herein have recognized that a solution is needed to maintain or approach the power gains available through global enrichment while reducing vehicle emissions. For example, increasingly stringent vehicle emissions standards may not enable such global enrichment strategies to be performed. Without the cooling effects of unreacted fuel achieved through enrichment, engine air flow may be reduced in order to protect exhaust system components from heat-related degradation, thereby reducing a maximum achievable engine power.

In one example, the issues described above may be addressed by a method, comprising: responsive to an engine load reaching a threshold load, increasing engine torque by increasing an amount of boost without providing exhaust gas recirculation (EGR) until reaching a first threshold torque; and responsive to the engine torque reaching the first threshold torque, increasing the engine torque by increasing an EGR rate over a plurality of engine cycles while further increasing the amount of boost. In this way, the EGR may provide temperature relief to exhaust system components to increase engine air flow without increasing vehicle emissions.

As one example, the EGR may provide temperature relief to the exhaust system components at boost amounts greater than a temperature-limited boost amount, above which the exhaust system components may experience heat-related degradation if a cooling intervention (e.g., the EGR) were not provided. As another example, the method may further include, responsive to the engine torque reaching a second threshold torque that is greater than the first threshold torque, decreasing the EGR rate to a non-zero rate over a plurality of engine cycles while increasing an air-fuel ratio difference between a first set of one or more engine cylinders and a second set of one or more engine cylinders over the plurality of engine cycles. For example, the second threshold torque may correspond to a torque value above which EGR alone is unable to provide sufficient exhaust system component cooling, such as due to the EGR rate reaching a threshold rate. Gradually increasing the air-fuel ratio difference between the first set of the one or more engine cylinders and the second set of the one or more engine cylinders may include gradually enriching the first set and gradually enleaning the second set by a corresponding amount so that an overall exhaust gas air-fuel ratio is maintained at stoichiometry. Further, the EGR may be selectively drawn from the first set of the one or more engine cylinders so that the EGR is enriched.

By increasing the EGR rate over a plurality of engine cycles responsive to the engine torque reaching the first threshold engine torque, engine power may be increased while engine vibrations are decreased and exhaust system component temperature protection is increased (versus abruptly stepping the EGR rate to a desired non-zero value), thereby increasing customer satisfaction while decreasing engine system degradation. Further, by gradually decreasing the EGR rate while gradually increasing the air-fuel ratio difference, engine power may be further increased while engine vibrations are decreased and exhaust system component temperature protection is increased (e.g., relative to abrupt air-fuel ratio and EGR rate changes). Overall, the engine may be operated with greater air consumption for increased engine power while heat-related degradation to the downstream components, such as a turbocharger turbine and an emission control device, may be decreased while vehicle emissions are decreased compared with globally enriching the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
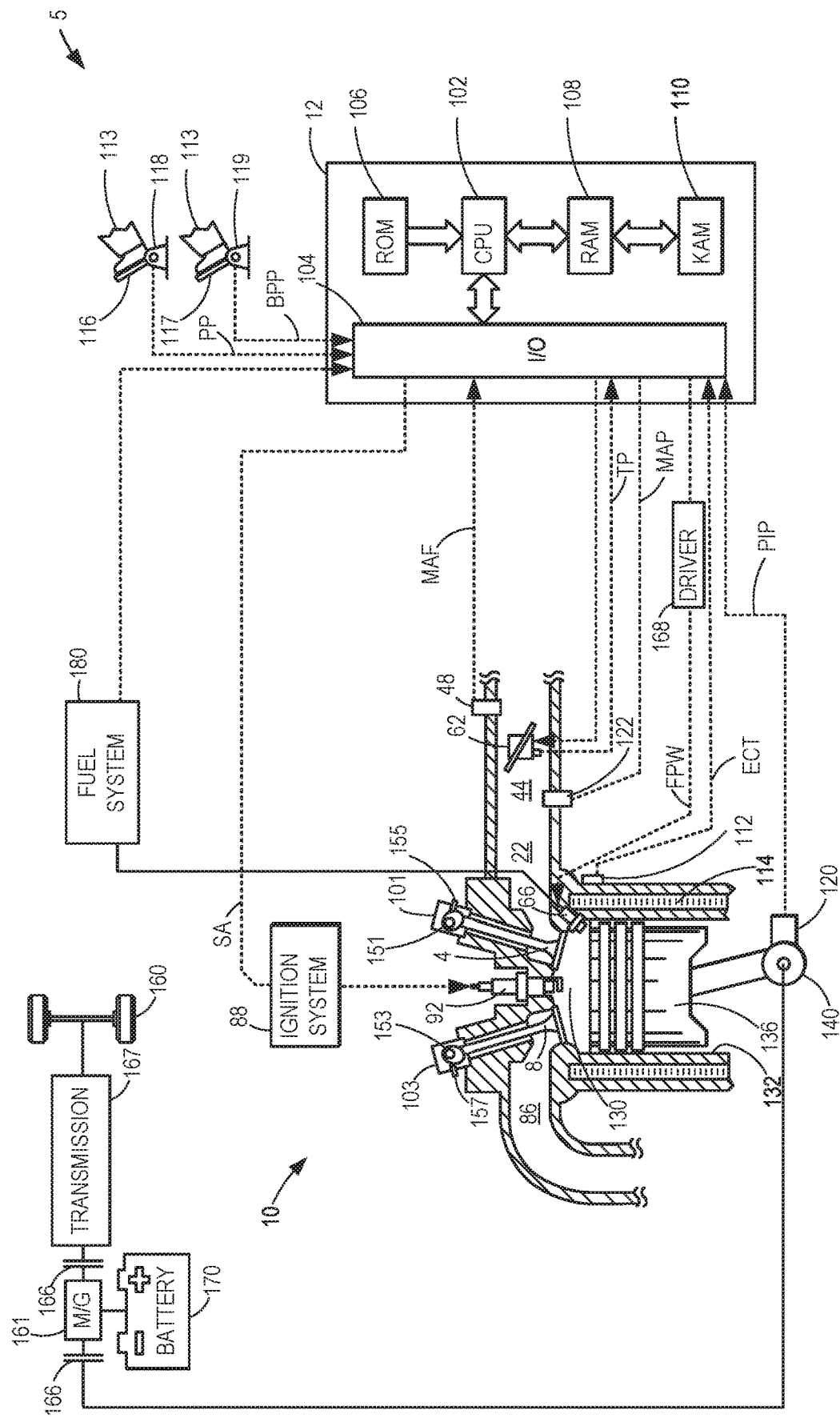
FIG. 1 shows an embodiment of a cylinder that may be included in an engine system.
Figure 2:
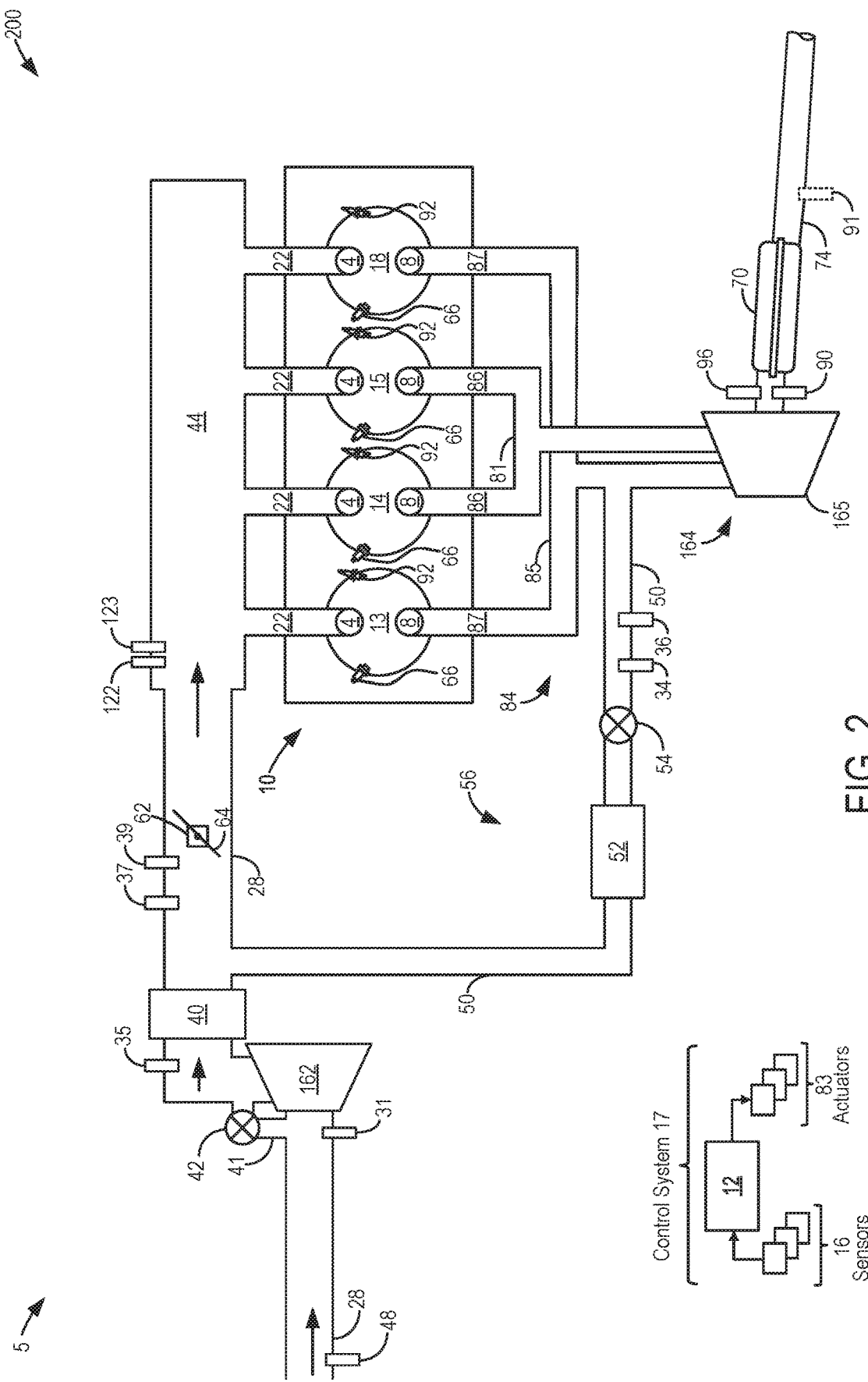
FIG. 2 shows a schematic depiction of a first example of an engine system.
Figure 3:
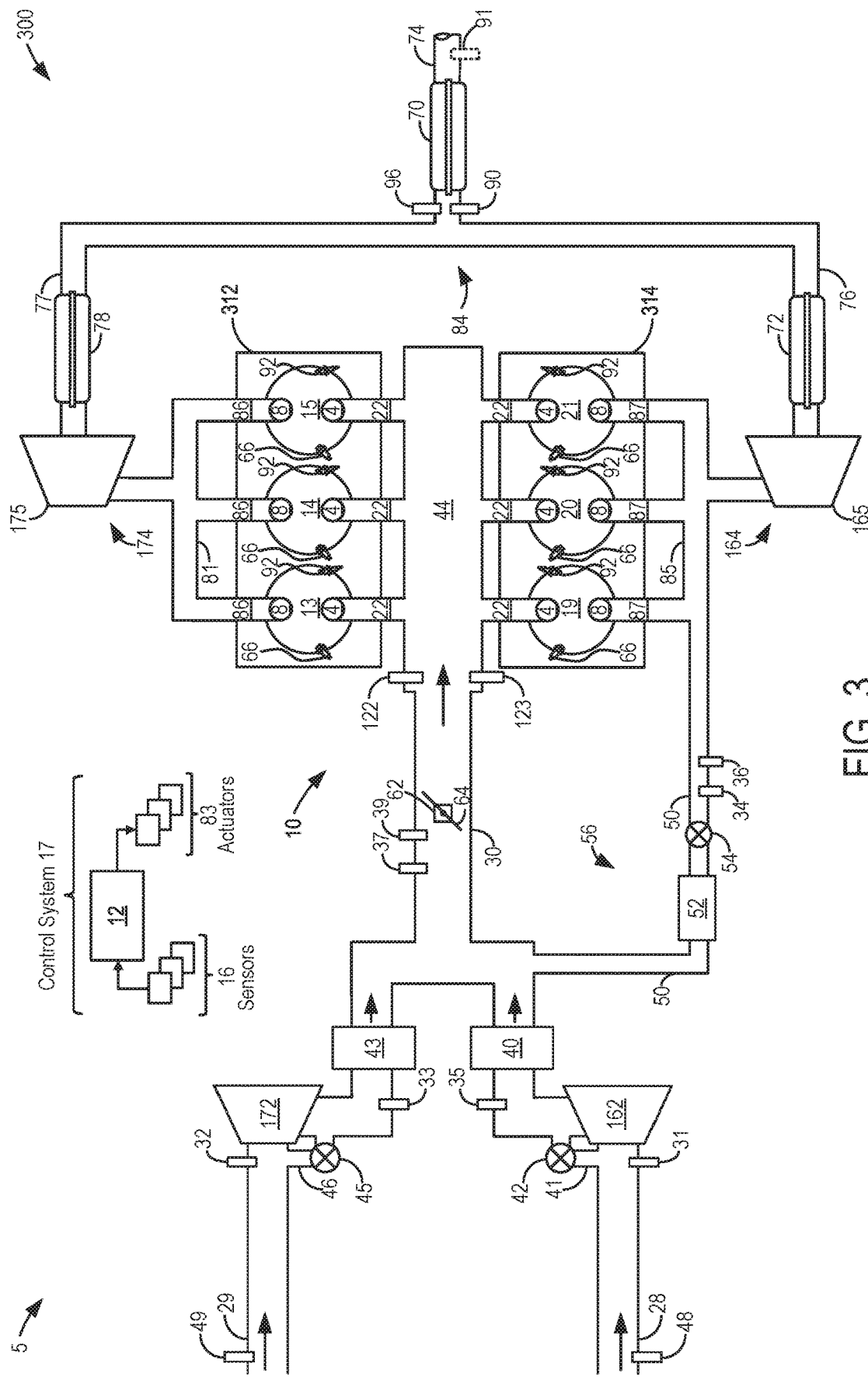
FIG. 3 shows a schematic depiction of a second example of an engine system.
Figure 4:
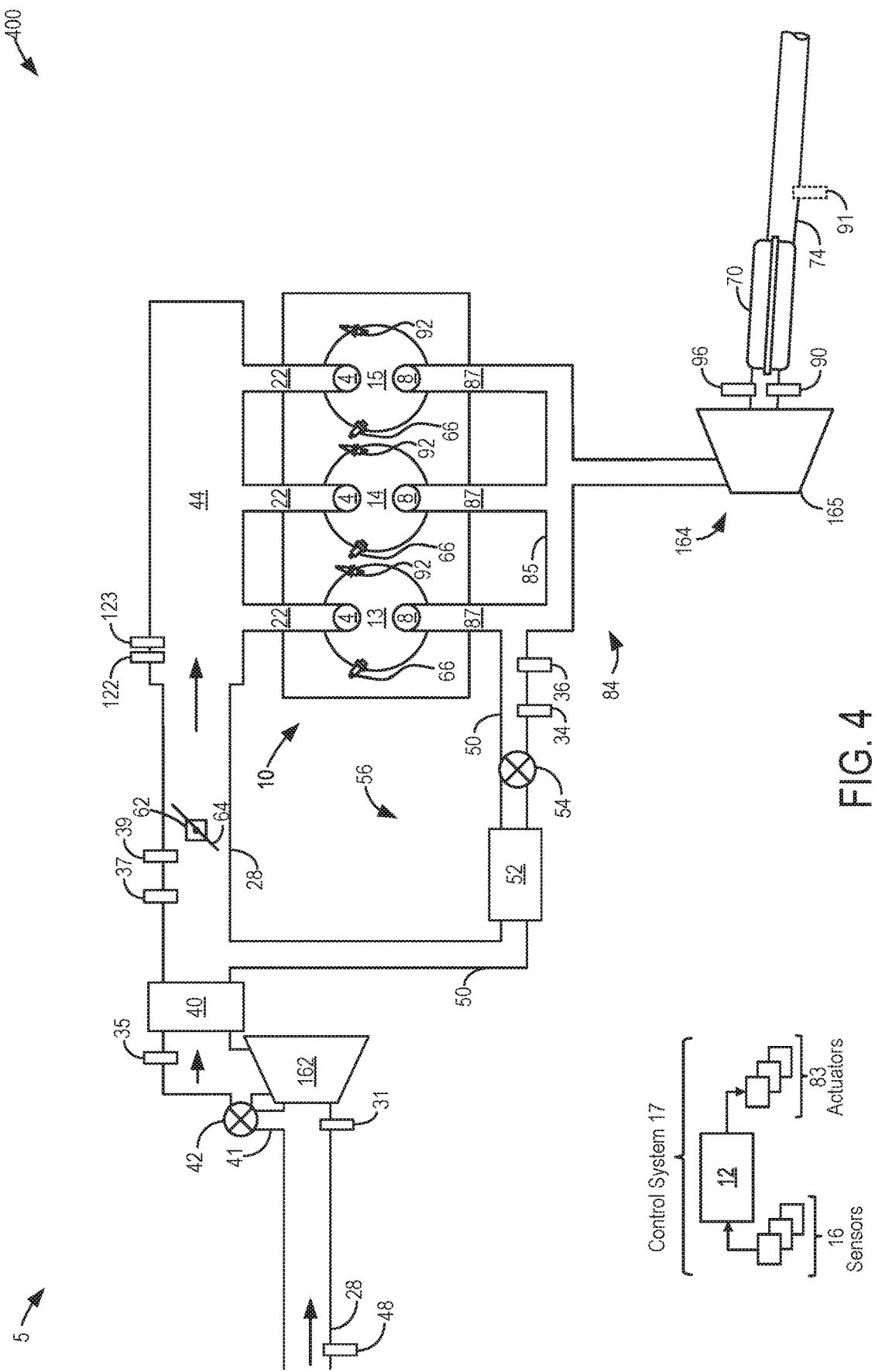
FIG. 4 shows a schematic depiction of a third example of an engine system.
Figure 6:
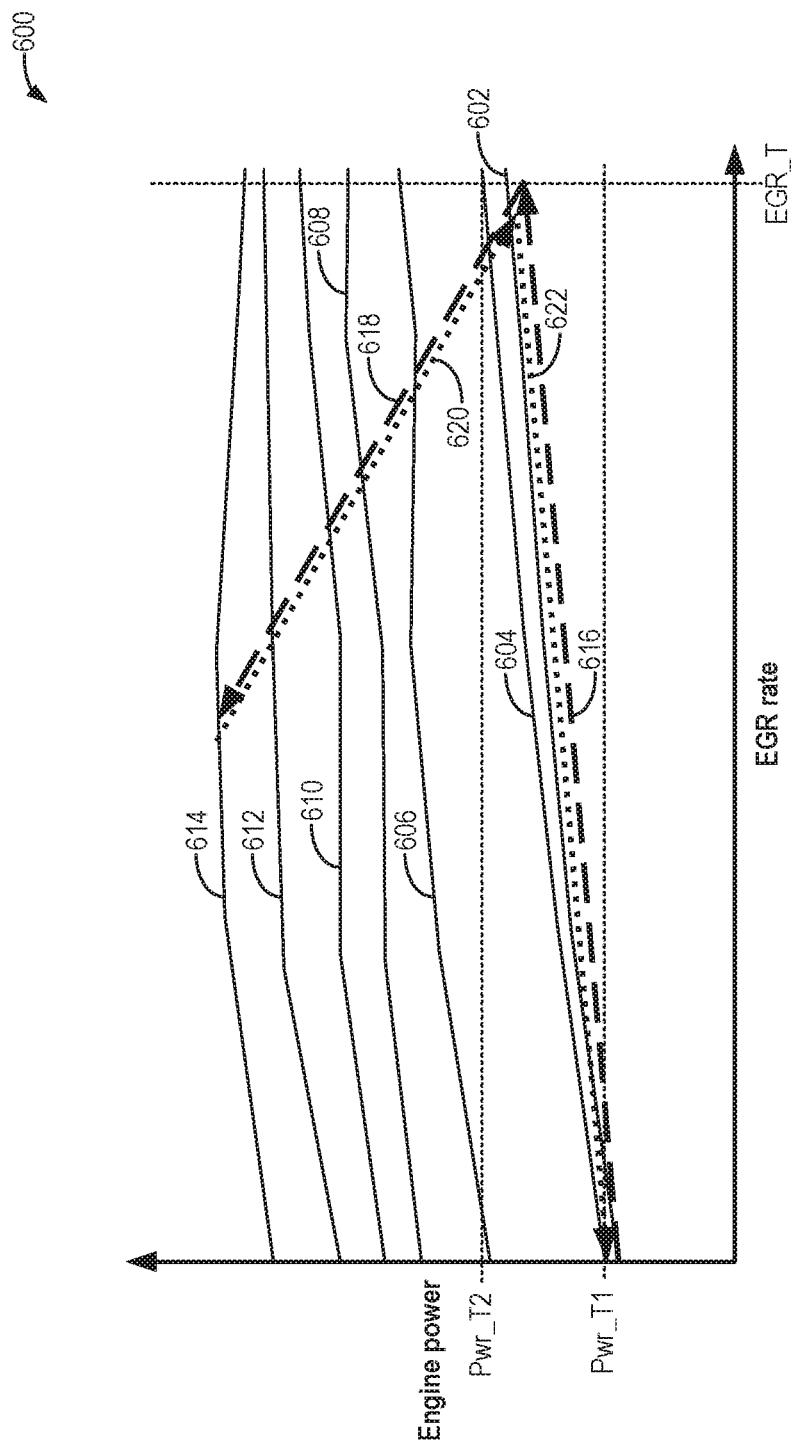
FIG. 6 shows a relationship between engine power and EGR rate at different air-fuel ratio splits.
Figure 7:
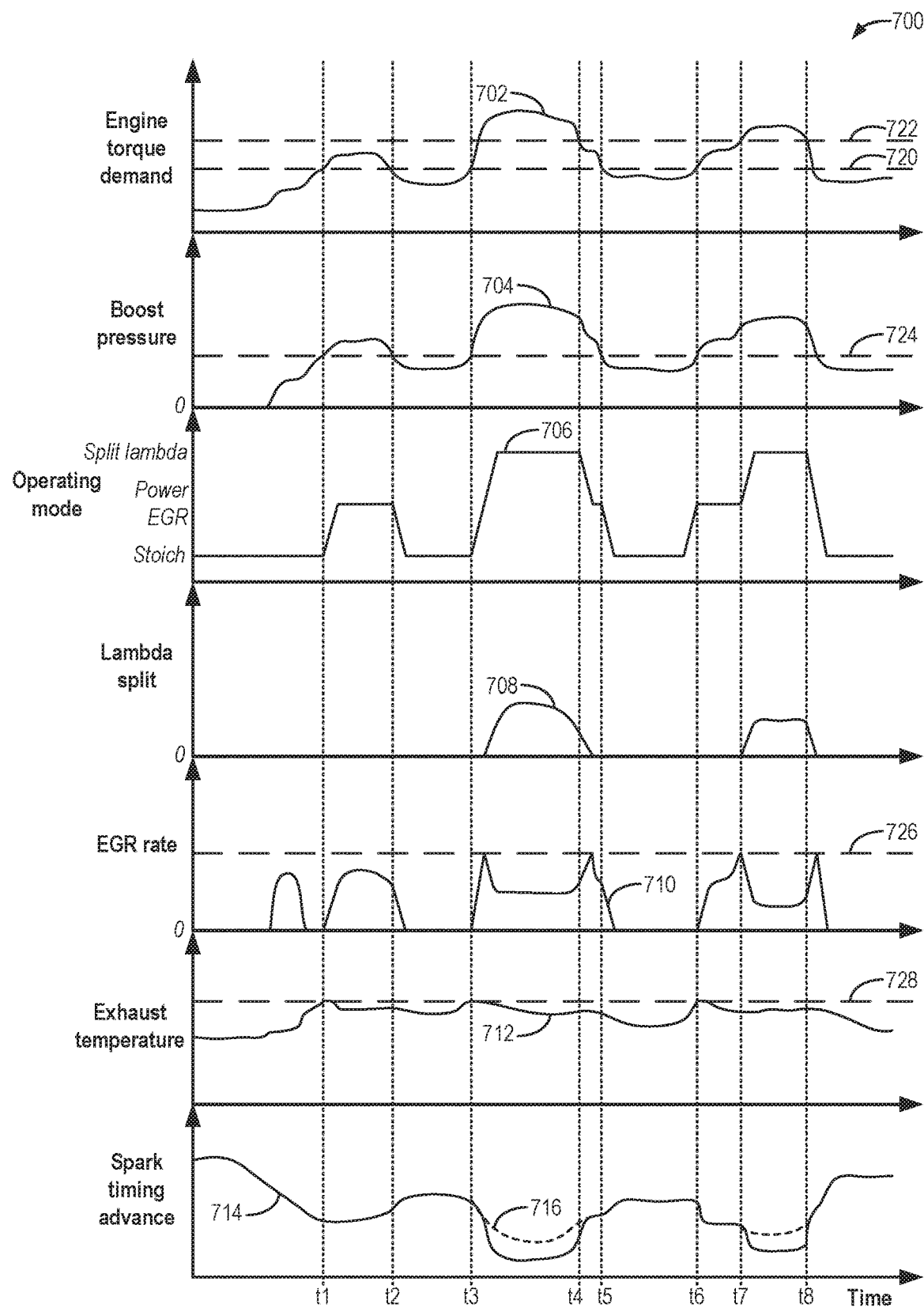
FIG. 7 shows a prophetic example timeline for adjusting engine operation to transition between various operating modes, including a stoichiometric mode, a power EGR mode, and a split lambda mode, based on an engine torque demand.

The following description relates to systems and methods for increasing a power output of an engine via exhaust gas recirculation (EGR) and partial engine enrichment. The engine may include various multi-cylinder configurations, such as the example engine system configurations shown in FIGS. 2-4, that enable EGR to be selectively drawn from a subset of the cylinders for EGR enrichment during the partial engine enrichment. In particular, FIG. 2 shows an inline-4 configuration that includes two cylinders coupled to a first exhaust manifold and two cylinders coupled to a second exhaust manifold, the second exhaust manifold coupled to an EGR passage. FIG. 3 shows a V-6 configuration, where EGR is provided from only one of the two cylinder banks. FIG. 4 shows an inline-3 configuration that includes the EGR passage coupled to an exhaust runner of one cylinder. Further, each cylinder of the engine may have a cylinder configuration, such as shown in FIG. 1. A controller may transition the engine into and out of operating with the partial enrichment, referred to herein as a split lambda mode, via the example method of FIG. 5. For example, transitioning into the split lambda mode may include a series of EGR rate, air-fuel ratio, and spark timing adjustments. As another example, engine power may be increased via EGR alone prior to the EGR rate reaching a threshold while operating all cylinders of the engine at stoichiometry, referred to herein as a power EGR mode. Further, the engine may be operated in a stoichiometric mode without using EGR to increase the engine power when the engine demand is lower (e.g., lower than a threshold). FIG. 6 illustrates a relationship between EGR rate and engine power at different lambda splits (e.g., a difference between a rich air-fuel ratio of a first cylinder group and a lean air-fuel ratio of a second cylinder group) and generally illustrates how the EGR rate and the lambda split are adjusted while transitioning between the power EGR mode and the split lambda mode. An example timeline illustrating transitioning between the stoichiometric mode, the power EGR mode, and the split lambda mode based on an engine torque demand is shown in FIG. 7. In this way, the engine power output may be increased without increasing vehicle emissions or degrading exhaust components via temperature increases.

Turning now to the figures, FIG. 1 shows a partial view of a single cylinder 130 of an internal combustion engine 10 that may be included in a vehicle 5. Internal combustion engine 10 may be a multi-cylinder engine, and different engine system configurations for engine 10 will be described below with respect to FIGS. 2-4. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 5.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As mentioned above, FIG. 1 shows only one cylinder of multi-cylinder engine 10. Referring now to FIG. 2, a schematic diagram of a first example engine system 200 is shown, which may be included in the propulsion system of vehicle 5 of FIG. 1. For example, engine system 200 provides a first example engine configuration of engine 10 introduced in FIG. 1. As such, components previously introduced in FIG. 1 are represented with the same reference numbers and are not re-introduced. In the example shown in FIG. 2, engine 10 includes cylinders 13, 14, 15, and 18, arranged in an inline-4 configuration, although other configurations of engine 10 will be described with respect to FIGS. 3 and 4. The engine cylinders may be capped on the top by a cylinder head. With respect to FIG. 2, cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

Each of cylinders 13, 14, 15, and 18 includes at least one intake valve 4 and at least one exhaust valve 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems.

Each cylinder receives intake air (or a mixture of intake air and recirculated exhaust gas, as will be elaborated below) from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually optimized for each cylinder, as will be further described below with respect to FIG. 5.

Inside cylinders 14 and 15 are each coupled to one exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to a first exhaust manifold 81 via exhaust ports 86, and cylinders 13 and 18 channel exhaust gases to a second exhaust manifold 85 via exhaust ports 87. First exhaust manifold 81 and second exhaust manifold 85 do not directly communicate with one another (e.g., no passage directly couples the two exhaust manifolds to one another).

Engine system 200 further includes a turbocharger 164, including a turbine 165 and an intake compressor 162 coupled on a common shaft (not shown). In the example shown in FIG. 2, turbine 165 is a twin scroll (or dual volute) turbine. In such an example, a first, hotter scroll of the twin scroll turbine may be coupled to second exhaust manifold 85, and a second, cooler scroll of the twin scroll turbine may be coupled to first exhaust manifold 81 such that first exhaust manifold 81 and second exhaust manifold 85 remain separated up to the turbine wheel. For example, the two scrolls may each introduce gas around the entire perimeter of the wheel, but at different axial locations. Alternatively, the two scrolls may each introduce gas to the turbine over a portion of the perimeter, such as over approximately 180 degrees of the perimeter. In another example, engine 10 may include a monoscroll turbine. In some examples of the monoscroll turbine, first exhaust manifold 81 and second exhaust manifold 85 may combine prior to reaching the turbine wheel. The twin scroll configuration may provide greater power to the turbine wheel compared with the monoscroll configuration by providing a minimum volume (e.g., exhaust gas from two cylinders and a smaller manifold volume) from a given combustion event. In contrast, the monoscroll configuration enables use of lower cost turbines that have higher temperature tolerances.

Rotation of turbine 165 drives rotation of compressor 162, disposed within intake passage 28. As such, the intake air becomes boosted (e.g., pressurized) at the compressor 162 and travels downstream to intake manifold 44. Exhaust gases exit turbine 165 into an exhaust passage 74. In some examples, a wastegate may be coupled across turbine 165 (not shown). Specifically, a wastegate valve may be included in a bypass coupled between an inlet of turbine 165 and exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

After exiting turbine 165, exhaust gases flow downstream in exhaust passage 74 to an emission control device 70. Emission control device 70 may include one or more emission control devices, such as one or more catalyst bricks and/or one or more particulate filters. For example, emission control device 70 may include a three-way catalyst configured to chemically reduce nitrogen oxides (NOx) and oxidize carbon monoxide (CO) and hydrocarbons (HC). In some examples, emission control device 70 may additionally or alternatively include a gasoline particulate filter (GPF). After passing through emission control device 70, exhaust gases may be directed out to a tailpipe. As an example, the three-way catalyst may be maximally effective at treating exhaust gas with a stoichiometric air-fuel ratio (AFR), as will be elaborated below.

Exhaust passage 74 further includes a plurality of exhaust sensors in electronic communication with controller 12, which is included in a control system 17. As shown in FIG. 2, exhaust passage 74 includes a first oxygen sensor 90 positioned upstream of emission control device 70. First oxygen sensor 90 may be configured to measure an oxygen content of exhaust gas entering emission control device 70. Exhaust passage 74 may include one or more additional oxygen sensors positioned along exhaust passage 74, such as a second oxygen sensor 91 positioned downstream of emission control device 70. As such, second oxygen sensor 91 may be configured to measure the oxygen content of the exhaust gas exiting emission control device 70. In one example, one or more of oxygen sensor 90 and oxygen sensor 91 may be universal exhaust gas oxygen (UEGO) sensors. Alternatively, a two-state exhaust gas oxygen sensor may be substituted for at least one of oxygen sensors 90 and 91. Exhaust passage 74 may include various other sensors, such as one or more temperature and/or pressure sensors. For example, as shown in FIG. 2, a sensor 96 is positioned within exhaust passage 74 upstream of emission control device 70. Sensor 96 may be a pressure and/or temperature sensor. As such, sensor 96 may be configured to measure the pressure and/or temperature of exhaust gas entering emission control device 70.

Second exhaust manifold 85 is directly coupled to an exhaust gas recirculation (EGR) passage 50 included in an EGR system 56. EGR passage 50 is coupled between second exhaust manifold 85 and intake passage 28, downstream of compressor 162. As such, exhaust gases are directed from second exhaust manifold 85 (and not first exhaust manifold 81) to air intake passage 28, downstream of compressor 162, via EGR passage 50, which provides high-pressure EGR. However, in other examples, EGR passage 50 may be coupled to intake passage 28 upstream of compressor 162.

As shown in FIG. 2, EGR passage 50 may include an EGR cooler 52 configured to cool exhaust gases flowing from second exhaust manifold 85 to intake passage 28 and may further include an EGR valve 54 disposed therein. Controller 12 is configured to actuate and adjust a position of EGR valve 54 in order to control a flow rate and/or amount of exhaust gases flowing through EGR passage 50. When EGR valve 54 is in a closed (e.g., fully closed) position, no exhaust gases may flow from second exhaust manifold 85 to intake passage 28. When EGR valve 54 is in an open position (e.g., from partially open to fully open), exhaust gases may flow from second exhaust manifold 85 to intake passage 28. Controller 12 may adjust the EGR valve 54 into a plurality of positions between fully open and fully closed. In other examples, controller 12 may only adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from second exhaust manifold 85. In some examples, EGR passage 50 may include additional sensors, such as temperature and/or humidity sensors, to determine a composition and/or quality of the exhaust gas being recirculated to intake passage 28 from second exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

Engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and EGR passage 50, as described above. Other sensors may include a throttle inlet temperature sensor for estimating a throttle air temperature (TCT) coupled upstream of throttle 62 in the intake passage. Further, it should be noted that engine 10 may include all or only a portion of the sensors shown in FIG. 2. As another example, actuators 83 may include fuel injectors 66, throttle 62, CRV 42, EGR valve 54, and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 5.

The configuration of engine system 200 may enable engine performance enhancement while reducing vehicle emissions. In particular, by including separate exhaust manifolds that do not directly communicate and that receive exhaust gases from different cylinders, the gases received by first exhaust manifold 81 may have a different AFR than the gases received by second exhaust manifold 85. Herein, the AFR will be discussed as a relative AFR, defined as a ratio of an actual AFR of a given mixture to stoichiometry and represented by lambda (λ). A lambda value of 1 occurs during stoichiometric operation (e.g., at stoichiometry), wherein the air-fuel mixture produces a complete combustion reaction. A rich feed (λ<1) results from air-fuel mixtures with more fuel relative to stoichiometry. For example, when a cylinder is enriched, more fuel is supplied to the cylinder via fuel injector 66 than for producing a complete combustion reaction with an amount of air in the cylinder, resulting in excess, unreacted fuel. In contrast, a lean feed (λ>1) results from air-fuel mixtures with less fuel relative to stoichiometry. For example, when a cylinder is enleaned, less fuel is delivered to the cylinder via fuel injector 66 than for producing a complete combustion reaction with the amount of air in the cylinder, resulting in excess, unreacted air. During nominal engine operation, the AFR may fluctuate about stoichiometry, such as by λ generally remaining within 2% of stoichiometry. For example, the engine may transition from rich to lean and from lean to rich between injection cycles, resulting in an "average" operation at stoichiometry.

Further, during some engine operating conditions, the AFR may be deviated from stoichiometry. As one example, global enrichment (in which each cylinder is operated with a rich AFR) is a conventional performance enhancement strategy to increase engine power. Generally, higher cylinder air charges result in more engine torque and thus more engine power, with the cylinder fueling correspondingly increased based on the higher air charge to maintain the enrichment. In particular, the additional, unreacted fuel cools engine system components, including the downstream turbine 165 and emission control device 70, enabling more air flow for increased power while reducing heat-related degradation to the downstream components (versus operating at stoichiometry with the higher cylinder air charge). However, as mentioned above, emission control device 70 is most effective at stoichiometry, and thus, the above described global enrichment strategy results in increased vehicle emissions, particularly increased CO and HC emissions.

Therefore, according to the present disclosure, such as when high engine torque (or high engine power) is demanded, a first set of cylinders may be operated at a first, rich AFR, and a second, remaining set of the engine cylinders may be operated at a second, lean AFR. Such operation will be referred to herein as "split lambda" operation (or operation in a split lambda mode). In particular, the inside cylinders may be operated at the lean AFR, resulting cylinders 14 and 15 feeding lean exhaust gas to first exhaust manifold 81, and the outside cylinders may be operated at the rich AFR, resulting in cylinders 13 and 14 feeding rich exhaust gas to second exhaust manifold 85. The lean exhaust gas in first exhaust manifold 81 may be isolated from the rich exhaust gas in second exhaust manifold 85 prior to mixing at and downstream of turbine 165. Further, a degree of enleanment of the second set of cylinders may selected based on a degree of enrichment of the first set of cylinders so that the exhaust gas from the first set of cylinders may mix with the exhaust gas from the second set of cylinders to form a stoichiometric mixture, even while none of the cylinders are operated at stoichiometry. Further still, the degree of enrichment of the first set of cylinders (and the degree of enleanment of the second set of cylinders) is greater than the typical fluctuation about stoichiometry performed during nominal engine operation. As an example, the first set of cylinders may be operated at a rich AFR having a lambda value in a range from 0.95-0.8 (e.g., 5-20% rich).

By maintaining engine 10 at overall (e.g., global) stoichiometry, even while operating in the split lambda operating mode, tailpipe emissions may be reduced. For example, operating in the split lambda mode may result in a substantial reduction in CO emissions compared to conventional enriched engine operation (e.g., a 90% reduction) while providing increased engine cooling and increased engine power, similar to the conventional enriched engine operation. As an example, controller 12 may transition engine 10 to and from the split lambda operating mode responsive to an increased engine demand, as will be further described with respect to FIG. 5.

Further, because EGR passage 50 is coupled to second exhaust manifold 85, which receives the enriched exhaust gas from outside cylinders 13 and 18 in during the split lambda operation, the exhaust gas recirculated to intake passage 28 (and supplied to every cylinder of engine 10) may be enriched. The enriched EGR contains relatively high concentrations (or amounts) of CO and hydrogen gas compared with lean EGR and stoichiometric EGR. CO and hydrogen gas have high effective octane numbers, offsetting the knock limit of each cylinder and creating an opportunity for additional spark advance to both the enriched and enleaned cylinders. The spark advance provides additional temperature relief to turbine 165 and emission control device 70, enabling even more air flow (and thus engine power) than when engine 10 is operated without enriched EGR. Thus, the cooled, enriched EGR may provide additional knock and efficiency benefits to engine 10. Further still, even prior to operating in the split lambda mode and enriching the EGR, providing EGR at high engine loads may provide engine cooling, enabling engine air flow to be increased relative to when no EGR is provided. Such operation will be referred to herein as a power EGR mode and will be further described with respect to FIG. 5.

Other engine system configurations may also enable operation in the split lambda mode with enriched EGR for increased engine power and reduced emissions. Next, FIG. 3 shows a second example configuration of engine 10. Specifically, FIG. 3 shows an example engine system 300 with engine 10 including cylinders 13, 14, 15, 19, 20, and 21 in a V-6 configuration. However, other numbers of engine cylinders are also possible, such as a V-8 configuration. Except for the differences described below, engine system 300 may be substantially identical to engine system 200 of FIG. 2. As such, components previously introduced in FIGS. 1 and 2 are represented with the same reference numbers and are not re-introduced.

In the example of engine system 300, engine 10 includes two engine banks, first engine bank 312 and second engine bank 314. Specifically, first engine bank 312 includes cylinders 13, 14, and 15, each coupled to intake manifold 44 via intake ports 22, and second engine bank 314 includes cylinders 19, 20, and 21, each coupled to intake manifold 44 via intake ports 22. Each of cylinders 13, 14, and 15 of first engine bank 312 exhausts combustion gases to first exhaust manifold 81 via exhaust ports 86. From first exhaust manifold 81, the gases may be directed to a turbine 175 of a turbocharger 174. In contrast, each of cylinders 19, 20, and 21 of second engine bank 314 exhausts combustion gases to second exhaust manifold 85, which is separate from exhaust manifold 85, via exhaust ports 87. For example, no passages directly couple first exhaust manifold 81 and second exhaust manifold 85. From second exhaust manifold 85, the gases may be directed to turbine 165 of turbocharger 164, which is different than turbocharger 174. For example, turbine 175 is positioned in a first exhaust passage 77 and receives exhaust gases exclusively from first exhaust manifold 81 for driving a compressor 172 positioned in an intake passage 29. Turbine 165 is positioned in a second exhaust passage 76 and receives exhaust gases exclusively from exhaust manifold 85 for driving compressor 162 positioned in intake passage 28. For example, as shown, compressor 172 may be coupled in parallel with compressor 162.

Thus, in the example configuration of engine system 300, exhaust system 84 includes two separate exhaust manifolds, first exhaust manifold 81 and second exhaust manifold 85, each coupled to engine cylinders of a single engine bank. Further, exhaust system 84 includes two turbochargers, turbocharger 164 and turbocharger 174, each having a turbine positioned to receive exhaust gas from only one of the two exhaust manifolds.

First exhaust passage 77 and second exhaust passage 76 merge and are coupled to exhaust passage 74 downstream of turbines 175 and 165, respectively. Exhaust passage 74 serves as a common exhaust passage. In some examples, one or both of exhaust passages 77 and 76 may include a close-coupled catalyst downstream of the corresponding turbine and upstream of exhaust passage 74. In the example shown in FIG. 3, a first close-coupled catalyst 78 is positioned in first exhaust passage 77 downstream of turbine 175 and upstream of where first exhaust passage 77 couples with common exhaust passage 74, and a second close-coupled catalyst 72 is positioned in second exhaust passage 76 downstream of turbine 165 and upstream of where second exhaust passage 76 couples with common exhaust passage 74. In contrast, emission control device 70 is positioned in common exhaust passage 74. Thus, while first close-coupled catalyst 78 receives exhaust gas exclusively from first engine bank 312 (e.g., via first exhaust manifold 81 and turbine 175) and second close-coupled catalyst 72 receives exhaust gas exclusively from second engine bank 314 (e.g., via second exhaust manifold 85 and turbine 165), emission control device 70 receives exhaust gas from both first engine bank 312 and second engine bank 314, and all of the exhaust gas directed out the tailpipe passes through exhaust passage 74 and emission control device 70. However, in other examples, first close-coupled catalyst 78 and second close-coupled catalyst 72 may be omitted.

When first close-coupled catalyst 78 and second close-coupled catalyst 72 are included, they may reduce vehicle emissions prior to operating in the split lambda mode (e.g., during an engine cold start). For example, due to being positioned closer to engine 10, first close-coupled catalyst 78 and second close-coupled catalyst 72 may receive more heat from the engine than emission control device 70 and may therefore achieve light-off faster. However, first close-coupled catalyst 78 and second close-coupled catalyst 72 may be less efficient while operating in the split lambda mode due to receiving only rich or lean exhaust gas. In such examples, emission control device 70 may effectively treat exhaust gas components not treated by first close-coupled catalyst 78 and second close-coupled catalyst 72.

As shown in FIG. 3, exhaust passage 74 includes first oxygen sensor 90 and sensor 96, each positioned upstream of emission control device 70, and the optional second oxygen sensor 91, positioned downstream of emission control device 70, as in engine system 200 described above with respect to FIG. 2. In other examples, additionally or alternatively, exhaust gas sensors, such as oxygen, temperature and/or pressure sensors, may be coupled to first exhaust passage 77 and/or second exhaust passage 76. For example, an oxygen sensor may be coupled to first exhaust passage 77 upstream of first close-coupled catalyst 78 and/or coupled to second exhaust passage 76 upstream of second close-coupled catalyst 72.

Intake passages 28 and 29 may be configured as two parallel intake passages that merge and couple to a common intake passage 30 upstream of throttle 62. As shown in FIG. 3, intake passage 28 includes CAC 40, as introduced in FIG. 2, and intake passage 29 includes a second CAC 43. However, in other examples, a single charge air cooler may be included, such as positioned in common intake passage 30 upstream of throttle 62. Intake passage 29 may include a second set of some or all of the various sensors positioned in intake passage 28 and described above with respect to FIG. 2 for determining various qualities of the intake air being provided engine 10. For example, intake passage 29 is shown including a MAF sensor 49, a temperature sensor 32, and an intake oxygen sensor 33. Alternatively, only one of intake passages 28 and 29 may include each sensor. For example, intake passage 28 may include MAF sensor 48 and temperature sensor 31 (and not intake oxygen sensor 35), and intake passage 29 may include intake oxygen sensor 33 (and not MAF sensor 49 and temperature sensor 32). As another example, intake passage 29 may include MAF sensor 49 (and not temperature sensor 32 and intake oxygen sensor 33), and intake passage 28 may include temperature sensor 31 and intake oxygen sensor 35 (and not MAF sensor 48).

Further, intake passage 29 may include a compressor recirculation passage 46 for recirculating compressed air from an outlet of compressor 172, upstream of CAC 43, to an inlet of compressor 172. A CRV 45 may be provided for adjusting an amount of flow recirculated to the inlet of compressor 172. Thus, compressor recirculation passage 46 and CRV 45 may function similarly to compressor recirculation passage 41 and CRV 42, respectively, as described above with respect to FIG. 2.

In the example of engine system 300, EGR passage 50 is directly coupled to second exhaust manifold 85 and is not coupled to first exhaust manifold 81. Thus, EGR system 56 recirculates exhaust gases produced by combustion in second engine bank 314 and not first engine bank 312 when EGR valve 54 is at least partially open. Further EGR passage 50 is shown coupled to intake passage 28 downstream of CAC 40 and upstream of where intake passage 28 couples to common intake passage 30. However, in other examples, EGR passage 50 may be coupled to common intake passage 30, such as upstream of throttle 62. Because intake passage 28 flows intake air to common intake passage 30, which provides intake air to every cylinder of engine 10 via intake manifold 44, when EGR is requested, the recirculated exhaust gas may be provided to each cylinder of engine 10.

Due to the configuration of EGR system 56, the cylinders of second engine bank 314 may be operated at the first, rich AFR, and the cylinders of first engine bank 312 may be operated at the second, lean AFR. In particular, cylinders 19, 30, and 21 may be operated at the rich AFR, resulting in rich exhaust gas flowing to second exhaust manifold 85, a portion of which may be recirculated to intake passage 28 via EGR passage 50. Cylinders 13, 14, and 15 may be operated at the lean AFR, resulting in lean exhaust gas flowing to first exhaust manifold 81. The lean exhaust gas in first exhaust manifold 81 is isolated from the rich exhaust gas in second exhaust manifold 85 prior to mixing at exhaust passage 74. Thus, while rich exhaust gas may flow through second close-coupled catalyst 72 and lean exhaust gas may flow through first close-coupled catalyst 78 during the split lambda operation, the exhaust gas flowing through emission control device 70 may be maintained stoichiometry, on average, to decrease emissions.

Still other engine systems may be operated in the split lambda mode. Turning to FIG. 4, a third example configuration of engine 10 is shown. Specifically, FIG. 4 shows an example engine system 400, with engine 10 having an inline-3 configuration instead of the inline-4 configuration of engine system 200 of FIG. 2. Except for the differences described below, engine system 400 may be substantially identical to engine system 200 of FIG. 2. As such, components previously introduced in FIGS. 1-3 are represented with the same reference numbers and are not re-introduced.

As mentioned above, in the example of engine system 400, engine 10 includes cylinders 13, 14, and 15, arranged in an inline-3 configuration. Further, exhaust system 84 of engine system 300 includes only exhaust manifold 85. As such, exhaust manifold 85 is coupled to each of cylinders 13, 14, and 15 (e.g., every cylinder of engine 10) via exhaust ports 87, and exhaust manifold 85 receives exhaust gases expelled from all of the cylinders of engine 10. The exhaust gases received by exhaust manifold 85 may be channeled to turbine 165, as described above.

When EGR is provided via EGR system 56, such as when EGR valve 54 is at least partially open, a portion of the exhaust gas may flow through EGR passage 50. In the example of engine system 300, EGR passage 50 may receive exhaust gas originating from each of cylinders 13, 14, and 15. However, EGR passage 50 is coupled to exhaust port 87 of cylinder 13, upstream of where exhaust port 87 of cylinder 13 joins exhaust manifold 85. Due to the position of EGR passage 50 of exhaust port 87 and fluid dynamics within exhaust manifold 85, a much higher proportion of the exhaust gas recirculated through EGR passage 50 may originate from combustion within cylinder 13 compared with cylinders 14 and 15. For example, at least 80% of the exhaust gas flowing through EGR passage 50 may originate from combustion within cylinder 13.

Due to the odd number of cylinders in engine 10 in engine system 400, operation in the split lambda mode may be different than when the engine has an even number of cylinders (such as in engine system 200 of FIG. 2 and engine system 300 of FIG. 3). For example, cylinders 13, 14, and 15 each may be operated with a different AFR while the exhaust gas that flows from exhaust manifold 85 to emission control device 70 maintains global stoichiometry. That is, a first cylinder may be operated at a first, rich AFR, a second cylinder may be operated at a second, stoichiometric AFR, and a third, remaining cylinder may be operated at a third, lean AFR, resulting in a stoichiometric mixture upstream of emission control device 70. Specifically, cylinder 13 may be operated at the rich AFR, cylinder 14 may be operated at stoichiometry, and cylinder 15 may be operated at the lean AFR. In another example, cylinder 14 may be operated at the lean AFR while cylinder 15 may be operated at stoichiometry. However, cylinder 13 may be selectively enriched so that the exhaust gas recirculated via EGR system 56 is enriched in order to achieve the spark advance and additional cooling benefits described above with respect to FIG. 2.

Thus, the systems of FIGS. 2-4 provide three example engine configurations (e.g., an inline configuration having an even number of cylinders, a V-configuration, and an inline configuration having an odd number of cylinders) and descriptions of how each of the three engine configurations enables operation in the split lambda mode with enriched EGR, thereby increasing engine power while decreasing fuel usage and reducing vehicle emissions. Note that the number of cylinders in each configuration may be changed without parting from the scope of this disclosure.

Figure 5:
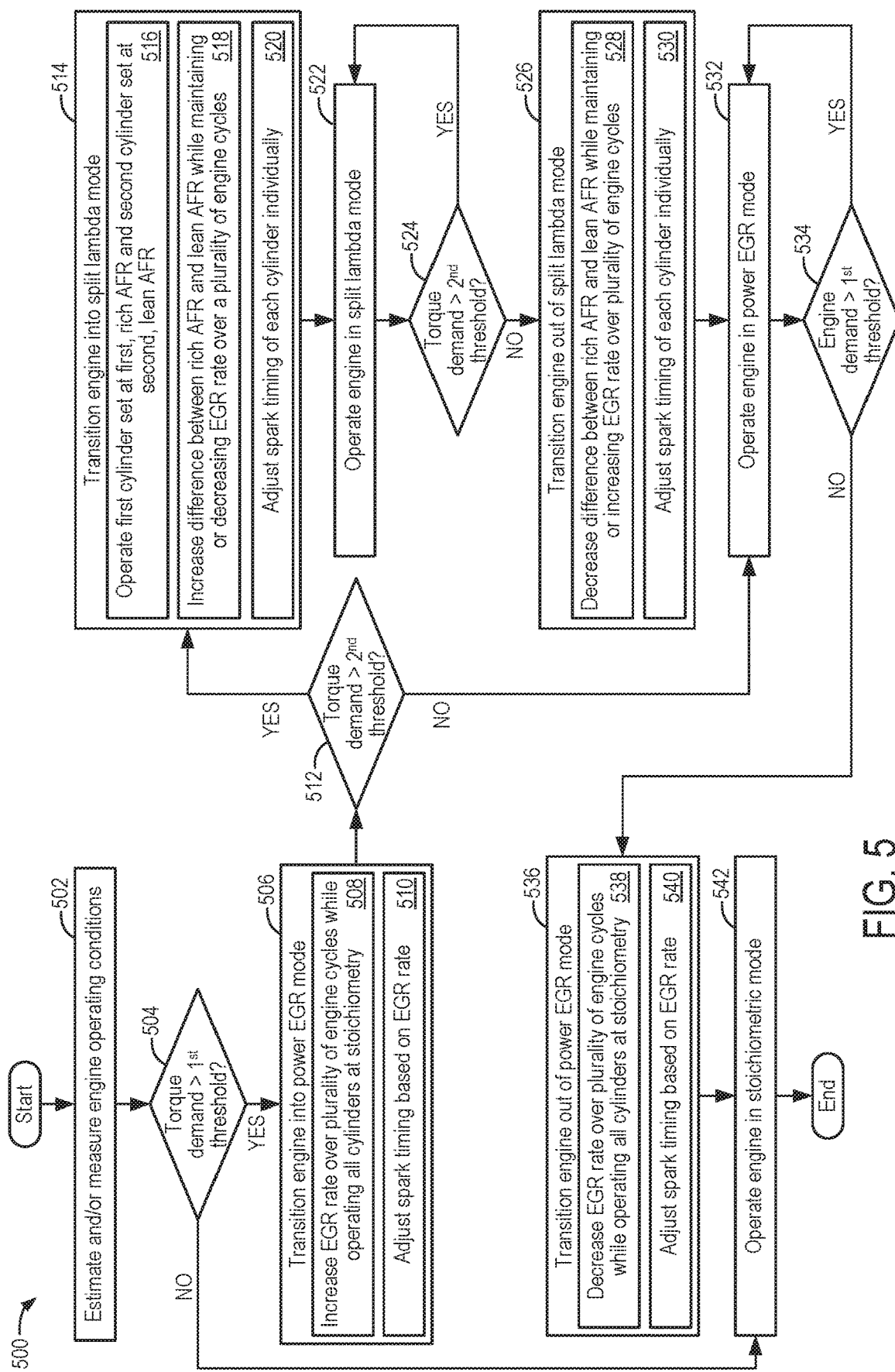
FIG. 5 depicts an example method for transitioning into and out of a stoichiometric mode, a power EGR mode, and a split lambda mode based on engine demand.

Next, FIG. 5 provides an example method 500 for adjusting engine operation based on engine demand, including transitioning into and out of the split lambda operating mode. For example, the split lambda combustion strategy inherently causes an imbalance between rich and lean cylinders due to different burn rates, which may result in engine vibrations. Therefore, method 500 provides a control strategy for mitigating this imbalance in order to reduce the engine vibrations. Method 500 additionally includes a control strategy for transitioning into and out of a power EGR mode, during which cooled EGR is provided to increase engine output via exhaust component temperature relief. For example, the power EGR mode may be used to produce engine power outputs that are greater than can be provided via boost without EGR due to exhaust temperature limitations and less than can be provided via the split lambda mode. Instructions for carrying out method 500 and the rest of the methods included herein may be executed by a controller (e.g., controller 12 of FIGS. 1-4) based on instructions stored on a memory of the controller and in conjunction with signals received from sensors of the engine system, such as the sensors described above with reference to FIGS. 1-4. The controller may employ engine actuators of the engine system (e.g., fuel injector 66 of FIGS. 1-4, spark plug 92 of FIGS. 1-4, and EGR valve 54 of FIGS. 2-4) to adjust engine operation according to the methods described below.

At 502, method 500 includes estimating and/or measuring engine operating conditions. The operating conditions may include, for example, a brake pedal position, an accelerator pedal position, ambient temperature and humidity, barometric pressure, engine speed, engine load, engine torque, engine temperature, mass air flow (MAF), intake manifold pressure (MAP), a commanded AFR, an actual AFR of exhaust gas entering an emission control device (e.g., emission control device 70 of FIGS. 2-4), an exhaust temperature, etc. As an example, the controller may use the accelerator pedal position to determine the engine torque demanded by a vehicle operator. For example, the controller may input the accelerator pedal position and the engine speed into an engine map to determine the engine torque demand. Further, the controller may determine engine power produced based on the engine torque and the engine speed, such as by multiplying the engine torque by the engine speed. As another example, the controller may determine a boost pressure provided by a turbocharger (e.g., turbocharger 164 of FIGS. 2-4) based on (e.g., as a function of) MAP and the barometric pressure.

At 504, method 500 includes determining whether the torque demand is greater than a first threshold torque. The first threshold torque may be a pre-calibrated non-zero engine torque value above which the torque cannot be further increased while operating the engine at stoichiometry without risking heat-related degradation to exhaust system components, such as a turbine of the turbocharger (e.g., turbine 165 of FIGS. 2-4) and the emission control device. As mentioned above with respect to FIG. 2, more engine air flow (e.g., higher MAF and/or MAP values) results in more engine power. However, as also mentioned above, this increases the temperature of the exhaust gas produced, and thus, the temperature of the exhaust system components. Therefore, the first threshold torque may be set based on a threshold exhaust temperature, the threshold exhaust temperature including a pre-calibrated non-zero exhaust temperature value above which exhaust system component degradation may be increased. As an alternative example of the method at 504, it may be determined if the engine power demand is greater than a first threshold power, which may correspond to the first threshold torque at a given engine speed.

If the torque demand is not greater than the first threshold torque, method 500 proceeds to 542 and includes operating the engine in a stoichiometric mode (also referred to herein as a stoichiometric operating mode). EGR may be provided, with a rate of the EGR adjusted responsive to engine speed and load, such as to provide EGR during part-load operation in order to increase engine efficiency, reduce fuel consumption, and decrease NOx emissions. Further, an amount of EGR provided may be limited by combustion stability or flow capability of the engine. This is different than providing EGR to increase engine power, as will be elaborated herein. For example, EGR may be provided when the engine load is greater than a first, lower threshold load and less than a second, higher threshold load. The first threshold load may be a pre-calibrated non-zero load below which EGR may cause unstable combustion. The second threshold load may be a pre-calibrated non-zero load above which EGR may reduce engine power. Additionally, boost may be provided via the turbocharger based on the torque demand. However, boost pressure (e.g., amount of boost) may be limited based on the exhaust temperature, such as to maintain the exhaust temperature below the threshold exhaust temperature. Thus, the boost pressure may be kept below a temperature-limited boost pressure threshold while operating in the stoichiometric mode. As one example, the temperature-limited boost pressure threshold may correspond to the boost pressure for producing the first threshold torque.

Method 500 may then end. Further, method 500 may be repeated so that the controller may update the operating mode as operating conditions change. For example, the controller may automatically and continuously (e.g., in real-time) repeat at least parts of method 500 so that changes in operating conditions, such changes in the torque demand, m be detected based on signals received from sensors of the engine system and evaluated to determine if the change in operating conditions warrant a change in the engine operating mode.

Returning to 504, if instead the torque demand is greater than the first threshold torque, method 500 proceeds to 506 and includes transitioning the engine into the power EGR mode. The power EGR mode (also referred to herein as the power EGR operating mode) is different than providing EGR to reduce fuel consumption and NOx emissions during part-load operation, described above. By providing EGR when the torque demand is greater than the first threshold torque, combustion temperatures may be decreased, thereby enabling a greater cylinder air charge (e.g., more boost) and corresponding fueling for increased engine power while reducing heat-related degradation of the exhaust components. For example, the power EGR mode may enable the engine torque to be increased above the first threshold torque while maintaining the exhaust temperature below the threshold exhaust temperature. For example, providing EGR while operating in the power EGR mode enables maximum engine load/torque/power by cooling the exhaust (dilution) and by increasing the knock limit, which further cools the exhaust. This cooling of the exhaust enables more air/load and thereby more power/torque output while maintaining lower exhaust temperatures, thereby decreasing the heat-related degradation of the exhaust components.

Transitioning the engine to the power EGR mode includes increasing the EGR rate over a plurality of engine cycles while operating all cylinders of the engine at stoichiometry, as indicated at 508. For example, at higher engine speeds and loads, such as may occur when the torque demand is approaching the first threshold torque, the engine may be operated without EGR (e.g., with an EGR rate of zero). Therefore, the EGR rate may be increased from zero responsive to the torque demand surpassing the first threshold torque. As one example, the EGR rate may be gradually increased from zero until the engine torque increases to the driver demanded torque or the EGR rate reaches a threshold EGR rate. The threshold EGR rate may be a non-zero, pre-calibrated EGR rate above which further increasing the EGR rate may result in misfire or partial burns. Increasing the EGR rate over the plurality of engine cycles may include the controller gradually opening the EGR valve from a fully closed position at a pre-calibrated rate, such as by adjusting a control signal sent to an actuator of the EGR valve at the pre-calibrated rate, for example. At the same time, the boost pressure may be gradually increased, such as increased above the temperature-limited boost pressure threshold. For example, the boost pressure may be gradually increased at a rate proportional to a rate of EGR increase. By gradually increasing the EGR rate over the plurality of engine cycles, engine vibrations may be decreased and the heat-related degradation of exhaust components may be further decreased relative to instantaneously stepping the EGR rate to a desired rate for producing the corresponding power increase.

Further, the engine may continue to be operated at stoichiometry, with all of the cylinders operated with a same (e.g., uniform) AFR. As mentioned above with respect to FIG. 2, operating the engine at stoichiometry may include small AFR fluctuations about stoichiometry between firings, but this is different than operating the engine globally enriched, globally enleaned, or assigning different AFRs to different cylinders or cylinder groups (as in the split lambda operating mode described herein).

Transitioning the engine to the power EGR mode further includes adjusting the spark timing based on the EGR rate, as indicated at 510. As one example, the spark timing may be globally adjusted (e.g., a same adjustment is made for each engine cylinder) based on the EGR rate as the EGR is gradually increased. Because EGR decreases the combustion temperature, the spark timing may be advanced, with a degree of the advancement proportional to the increase in the EGR rate. As one example, the controller may input the EGR rate (or the degree of opening of the EGR valve) into a look-up table, algorithm, or map, which may output the corresponding spark timing. As another example, the controller may determine the spark timing based on logic rules that are a function of the EGR rate (or the degree of opening of the EGR valve). The controller may then generate a control signal (e.g., signal SA) that is sent an ignition system (e.g., ignition system 88 of FIG. 1) to actuate the spark plug of each cylinder at the determined spark timing. As an example, spark may be delivered at MBT spark timing or borderline spark timing (e.g., based on feedback from a knock sensor).

At 512, method 500 includes determining whether the torque demand is greater than a second threshold torque, which is greater than the first threshold torque described above at 504. The second threshold torque may be a pre-calibrated non-zero engine torque value above which the torque cannot be further increased while operating the engine in the power EGR mode, such as due to reaching the threshold EGR rate. As an alternative example of the method at 512, it may be determined if the engine power demand is greater than a second threshold power, which may correspond to the second threshold torque at a given engine speed.

If the torque demand is not greater than the second threshold torque, method 500 proceeds to 532 and includes operating the engine in the power EGR mode. That is, EGR may be provided for exhaust component temperature relief, enabling the engine to produce torque values that are greater than the first threshold torque and less than the second threshold torque without degrading exhaust components, as described above at 506. Thus, the engine may be transitioned into (e.g., at 506) and then operated in the power EGR mode (e.g., at 532).

If instead the torque demand is greater than the second threshold torque, method 500 proceeds to 514 and includes transitioning the engine into the split lambda operating mode. As a first example, the engine may be transitioned into the split lambda operating mode responsive to a further increase in the torque demand that results in the torque demand surpassing the second threshold torque while operating in the power EGR mode. As a second example, the torque demand may be rapidly increased from below the first threshold torque to above the second threshold torque. In the second example, transitioning into the power EGR mode may prepare the engine for transitioning into the split lambda operating mode with reduced vibrations and increased exhaust component temperature control. For example, the engine may be transitioned into the split lambda operating mode responsive to the EGR rate reaching the threshold EGR rate while temporarily operating in the power EGR mode. Thus, the power EGR mode serves as both a distinct operating mode for increasing engine power, such as when the torque demand is greater than the first threshold torque but less than the second threshold torque (e.g., as at 532), and for transitioning the engine into the split lambda operating mode.

Transitioning the engine into the split lambda operating mode includes operating a first cylinder set at a first, rich AFR and a second cylinder set at a second, lean AFR, as indicated at 516. In some examples, the method may further include operating a third cylinder set at stoichiometry, such as when the engine includes an odd number of cylinders.

Each of the first cylinder set and the second cylinder set may include one or more cylinders, with a number of cylinders in the first cylinder set equal to a number of cylinders in the second cylinder set. For example, when the engine includes an even number of cylinders and two exhaust manifolds, the cylinders may be equally divided between the rich and lean cylinders (e.g., half of the cylinders are operated at the rich AFR, and half of the cylinders are operated at the lean AFR). This may include operating all of the cylinders coupled to a first exhaust manifold (e.g., first exhaust manifold 81 of FIGS. 2 and 3) at the lean AFR and operating all of the cylinders coupled to a second exhaust manifold (e.g., second exhaust manifold 85 of FIGS. 2 and 3) at the rich AFR, the second exhaust manifold further coupled to the EGR system. As one example, when the engine includes two engine banks, the cylinders of a first engine bank (e.g., first engine bank 312 of FIG. 3) may be operated at the lean AFR while the cylinders of a second engine bank (e.g., second engine bank 314 of FIG. 3) may be operated at the rich AFR. As another example, when the engine includes an odd number of cylinders, one cylinder may be operated at stoichiometry while the remaining cylinders are equally divided between the rich AFR (e.g., the first cylinder set) and the lean AFR (e.g., the second cylinder set). Further, as elaborated above with respect to FIG. 2, the rich AFR and the lean AFR may be balanced to produce a stoichiometric mixture at the downstream emission control device.

Further still, transitioning the engine into the split lambda mode includes increasing a difference between the rich AFR and the lean AFR while maintaining or decreasing the EGR rate over a plurality of engine cycles, as indicated at 518. The difference between the rich AFR and the lean AFR may be referred to herein as a lambda split. Thus, transitioning the engine into the split lambda mode includes increasing the lambda split. For example, the lambda split may be incrementally increased while the EGR rate is incrementally decreased each engine cycle until the engine demand is met. This may include the controller further enriching the first set of cylinders each engine cycle and further enleaning the second set of cylinders by a corresponding amount to maintain a stoichiometric exhaust gas mixture at the emission control device. For example, a degree of the enrichment of the first set of cylinders may be equal to a degree of the enleanment of the second set of cylinders each engine cycle. As one non-limiting illustrative example, the rich AFR may be decreased by a lambda value of 0.02 each engine cycle, and the lean AFR may be correspondingly increased each engine cycle to maintain a stoichiometric exhaust gas mixture at the emission control device. As another example, the EGR rate may be maintained for a plurality of engine cycles as the lambda split is increased. As will be illustrated with respect to FIG. 6, at higher lambda splits and some EGR ranges, adjusting the EGR rate may not affect the output engine torque/power.

As an example, the controller may determine an AFR to command for each cylinder each engine cycle based on whether the cylinder is in the first cylinder set or the second cylinder set (and in some examples, the third cylinder set) and a desired lambda split. Then, the controller may adjust a pulse width of a signal FPW sent to a fuel injector of each cylinder based on the commanded AFR of the particular cylinder and a cylinder air charge amount, such as via a look-up table or function. Further, the controller may adjust the control signal sent to the EGR valve each engine cycle in order to proportionally decrease the opening of the EGR valve as the lambda split is increased. However, the EGR valve may remain partially open during operation in the split lambda mode in order to provide a non-zero EGR rate.

It may be understood that in order to meet the increased engine torque demand, the boost pressure may be further increased. As an example, the boost pressure may be incrementally increased each engine cycle at a rate proportional to the change in the lambda split each engine cycle. For example, the boost increase may be calibrated to the degree of the enrichment of the first set of cylinders as well as the EGR rate, two parameters that influence exhaust component cooling, in order to prevent and/or reduce heat-related degradation as the engine torque output is further increased.

Transitioning the engine into the split lambda operating mode further includes adjusting the spark timing of each cylinder individually, as indicated at 520. Alternatively, this may include adjusting the spark timing of each cylinder set independently from the other cylinder set(s). Because EGR decreases the combustion temperature and further due to the EGR being drawn from the first, enriched cylinder set, the spark timing may be advanced for each cylinder, with a degree of the advancement different for the first cylinder set and the second cylinder set. Additionally, a degree of enrichment of the EGR may be equal to a degree of enrichment of the first cylinder set. Therefore, as one example, the controller may input the EGR rate (or the degree of opening of the EGR valve), the degree of enrichment of the EGR, and the commanded AFR of the particular cylinder into a look-up table, algorithm, or map, which may output the corresponding spark timing. As another example, the controller may determine the spark timing based on logic rules that are a function of the EGR rate (or the degree of opening of the EGR valve), the degree of enrichment of the EGR, and the commanded AFR of the cylinder. The controller may then generate a control signal that is sent the ignition system to actuate the spark plug of each cylinder at the determined spark timing for that individual cylinder. As one example, the controller may store pre-calibrated MBT spark timing values for each cylinder set (e.g., rich, lean, and stoichiometry) in non-transitory memory, and each cylinder may be operated at either MBT spark timing for that set of cylinders or borderline spark timing, as controlled by the knock sensor. Further, the MBT spark timing may be more advanced for the lean cylinder set and less advanced for the rich cylinder set due to different burn rates of the cylinder sets.

At 522, method 500 includes operating the engine in the split lambda operating mode. Thus, the engine may be transitioned into (e.g., at 514) and then operated in the split lambda mode (e.g., at 522) to provide exhaust component temperature relief with reduced vehicle emissions, enabling the engine to produce torque values that are greater than the second threshold torque while maintaining the exhaust temperature below the threshold exhaust temperature.

At 524, method 500 includes determining whether the torque demand remains above the second threshold torque (as defined above at 512). For example, the controller may continuously evaluate the engine operating conditions to determine if there is a change in the torque demand, and responsive to a change in the torque demand, compare the newly requested torque demand to the second threshold torque. As one example, after the engine is transitioned into the split lambda operating mode, the torque demand may decrease below the second threshold torque, such as due to a driver tip-out event. If instead the torque demand remains above the second threshold torque, method 500 may return to 522 to continue operating the engine in the split lambda mode.

If the torque demand decreased below the second threshold torque, method 500 proceeds to 526 and includes transitioning the engine out of the split lambda operating mode. Similar to the sequence of engine adjustments for transitioning the engine into the split lambda operating mode (e.g., described above at 514), the sequence of engine adjustments for transitioning the engine out of the split lambda operating mode may be calibrated to reduce engine vibrations and maintain the exhaust temperature below the threshold temperature.

Transitioning the engine out of the split lambda operating mode includes decreasing the difference between the rich AFR and the lean AFR while maintaining or increasing the EGR rate over a plurality of engine cycles, as indicated at 528. For example, the lambda split may be gradually decreased over the plurality of engine cycles until the lambda split reaches zero and all of the engine cylinders are operated at a uniform commanded AFR (e.g., stoichiometry). This may include the controller decreasing the degree of enrichment of the first set of cylinders each engine cycle and adjusting the lean AFR of the second set of cylinders by a corresponding amount to maintain the stoichiometric exhaust gas mixture at the emission control device. As one non-limiting illustrative example, the rich AFR may be increased by a lambda value of 0.02 each engine cycle, with the lean AFR correspondingly increased. At the same time, the EGR rate may be gradually increased over the plurality of engine cycles until the threshold EGR rate is reached. As another example, the EGR rate may be maintained for a plurality of engine cycles as the lambda split is decreased, as adjusting the EGR rate may not affect the output engine torque/power over some lambda splits and EGR ranges.

Transitioning the engine out of the split lambda operating mode further includes adjusting the spark timing for each cylinder individually, as indicated at 530. Alternatively, this may include adjusting the spark timing of each cylinder set independently from the other cylinder set(s). Because the EGR rate, the degree of enrichment of the EGR, and the commanded AFR of the first cylinder set and the second cylinder set are all changing each engine cycle during the transitioning, the controller may adjust the spark timing for each cylinder each engine cycle. Although the directionality of the adjustments made while transitioning the engine out of the split lambda mode may be opposite those made while transitioning the engine into the split lambda mode (e.g., at 514), the controller may determine the spark timing for each cylinder in the same manner described above at 520.

Once the engine has been transitioned out of the split lambda operating mode and the engine is operated with a uniform commanded AFR (e.g., stoichiometry), method 500 proceeds to 532 to operate the engine in the power EGR mode, as described above. Thus, transitioning the engine out of the split lambda operating mode also includes transitioning the engine into the power EGR mode.

At 534, method 500 includes determining if the torque demand is greater than the first threshold torque (introduced above at 504). As one example, the torque demand may decrease below the second threshold torque (as determined at 524) while remaining above the first threshold torque, and thus, method 500 may return to 532 to continue operating in the power EGR mode. If instead the torque demand has decreased below the first threshold torque, method 500 proceeds to 536 and includes transitioning the engine out of the power EGR mode.

Transitioning the engine out of the power EGR mode includes decreasing the EGR rate over a plurality of engine cycles while operating all of the cylinders at stoichiometry, as indicated at 538. As one example, the EGR rate may be decreased at the same rate the EGR was increased at 508. For example, the controller may decrease the EGR rate from the threshold EGR rate over a plurality of engine cycles by gradually closing the EGR valve until the EGR valve is fully closed and the EGR rate is zero. By gradually decreasing the EGR rate over the plurality of engine cycles, engine vibrations may be decreased and the heat-related degradation of exhaust components may be further decreased relative to instantaneously reducing the EGR rate to zero.

Transitioning the engine out of the power EGR mode further includes adjusting the spark timing based on the EGR rate, as indicated at 540. As one example, the spark timing may be globally adjusted (e.g., the same adjustment is made for each engine cylinder) based on the EGR rate as the EGR is gradually decreased. Because EGR decreases the combustion temperature, the spark timing may be less advanced as the EGR rate decreases each engine cycle. Although the directionality of the adjustments made while transitioning the engine out of the power EGR mode may be opposite those made while transitioning the engine into the power EGR mode (e.g., at 506), the controller may determine the spark timing as described above at 510.

Once the engine is transitioned out of the power EGR mode, method 500 may proceed to 542 to operate the engine in the stoichiometric mode, as described above. For example, in response to the torque demand continuing to decrease and the engine load dropping below the threshold load, the EGR rate may be increased from zero for increased engine efficiency and decreased fuel consumption during part-load operation. Further, boost may be provided based on engine demand while remaining below the temperature-limited boost pressure threshold.

In this way, method 500 provides a method for operating an engine of a vehicle in different operating modes (e.g., a stoichiometric mode, a power EGR mode, and a split lambda mode) based on an engine torque (or power) demand while reducing heat-related exhaust component degradation and reducing vehicle emissions. As illustrated by examples herein, the method of operating and performing actions responsive to a determination of the engine torque demand may include operating the engine to produce torque (e.g., operating with the vehicle traveling and the engine combusting to provide driver-demanded torque), selecting an operating mode that will provide the engine torque demand (such as based on sensor output, e.g., accelerator pedal position sensor output) and performing actions in response thereto. For example, in response to the engine torque demand being less than a first threshold, a controller may select the stoichiometric operating mode. Responsive to selecting the stoichiometric operating mode, the controller may set a commanded AFR to stoichiometry for all cylinders and actuate fuel injectors to fuel the engine accordingly to operate the engine in the stoichiometric mode. As another example, in response to the engine torque demand being greater than the first threshold and less than a second, higher threshold, the controller may select the power EGR mode. Responsive to selecting the power EGR mode, the controller may transition the engine into the power EGR mode by increasing the EGR rate over a plurality of engine cycles (e.g., by adjusting a signal sent to an EGR valve to increase an opening of the EGR valve) and advancing the spark timing (e.g., by adjusting a spark advance signal sent to an ignition system). Further, the controller may set the commanded AFR at stoichiometry for all cylinders. As still another example, in response to the engine torque demand exceeding the second threshold, the controller may select the split lambda mode. Responsive to selecting the split lambda mode, the controller may transition the engine into the split lambda mode by decreasing the EGR rate (to a non-zero EGR rate), adjusting the AFR of a first cylinder set to a rich AFR, and adjusting the AFR of a second cylinder set to a lean AFR, a degree of enrichment of the rich AFR and a degree of the enleanment of the second cylinder set increased over a plurality of engine cycles and set to produce an overall stoichiometric AFR. Additionally, the controller may further advance the spark timing.

The transitioning into and out of the power EGR mode and the split lambda mode described above is illustrated with respect to FIG. 6. An example graph 600 of FIG. 6 shows a relationship between engine power and EGR rate at different commanded AFRs and spark timings. The horizontal axis represents the EGR rate, with the EGR rate increasing from zero along the horizontal axis from left to right. The vertical axis represents the engine power, with the engine power increasing up the vertical axis from bottom to top. Further, each plot of graph 600 represents different engine operating parameters. Plot 602 shows engine operation at stoichiometry without optimized spark timing, plot 604 shows engine operation at stoichiometry with optimized spark timing, plot 606 shows engine operation with a first lambda split and optimized spark timing, plot 608 shows engine operation with a second lambda split and optimized spark timing, plot 610 shows engine operation with a third lambda split and optimized spark timing, plot 612 shows engine operation with a forth lambda split and optimized spark timing, and 614 shows engine operation with a fifth lambda split and optimized spark timing. Further, an EGR threshold (EGR_T) is shown, which may be the threshold EGR rate described above with respect to 508 of FIG. 5. Two engine power thresholds are shown, a first, lower engine power threshold (Pwr_T1) and a second, higher engine power threshold (Pwr_T2). The first engine power threshold may correspond to the first engine torque threshold described above with respect to 504 of FIG. 5 for a given engine speed, and the second engine power threshold may correspond to the second engine torque threshold described above with respect to 512 of FIG. 5 for the given engine speed.

As illustrated by plots 602 and 604, optimizing the spark timing while operating the engine at stoichiometry increases engine power. For example, for a same EGR rate, plot 604, representing engine operation at stoichiometry with optimized spark timing, results in a higher engine power than when the engine is operated at stoichiometry without optimized spark timing (plot 602). Further, each of plots 602 and 604 show that increasing the EGR rate results in increased engine power. For example, in response to an engine power demand surpassing the first engine power threshold, the EGR rate may be increased from zero to increase the engine power, as indicated by dashed arrow 616. Thus, dashed arrow 616 generally represents phasing in EGR during transitioning into the power EGR mode, as described above with respect to 506 of FIG. 5.

If the engine power demand remains between the first engine power threshold and the second engine power threshold, the engine may be operated in the power EGR mode, such as along plot 604. If instead the engine power demand is greater than the second engine power threshold and/or the EGR rate reaches the EGR threshold, the engine may be transitioned into the split lambda mode. Plots 606, 608, 610, 612, and 614 all show engine operation in the split lambda mode, each having a different lambda split. In the example of graph 600, plot 606 includes the smallest lambda split, and plot 614 includes the largest lambda split, with the lambda split gradually increasing across the plots between plot 606 and plot 614 (e.g., plot 610 includes a greater lambda split than plot 608, and plot 612 includes a greater lambda split than plot 610). As illustrative examples, plot 606 may include engine operation with λ=0.93 for the rich AFR (e.g., in a first cylinder set), plot 608 may include engine operation with λ=0.91 for the rich AFR, plot 610 may include engine operation with λ=0.89 for the rich AFR, plot 612 may include engine operation with λ=0.87 for the rich AFR, and plot 614 may include engine operation with λ=0.85 for the rich AFR. Further, each lambda split includes engine operation with a corresponding lean AFR (e.g., in a second cylinder set) so that a stoichiometric exhaust gas mixture is produced by the engine. As demonstrated by these plots, a greater lambda split results in greater engine power for a same EGR rate.

As described above with respect to 514 of FIG. 5, transitioning into the split lambda mode includes increasing the lambda split while decreasing the EGR rate, as indicated by a dashed arrow 618. Thus, dashed arrow 618 generally represents phasing in the lambda split while phasing out EGR (to a non-zero rate). As one example, the engine power demand may be increased from below the first engine power threshold to above the second engine power threshold. In such an example, adjustments to the engine operating parameters may first follow dashed arrow 616 and then follow dashed arrow 618. Based on the particular engine power demand while operating in the split lambda mode, the engine may be operated along one of plots 606, 608, 610, 612, and 614, for example, although other plots are also possible (e.g., having different lambda splits).

Transitioning out of the split lambda mode to the EGR power mode is shown generally by a dotted arrow 620. As elaborated above with respect to 526 of FIG. 5, responsive to the engine power demand decreasing below the second engine power threshold the lambda split is decreased (e.g., until the lambda split equals zero) while the EGR rate is increased, resulting in the engine transitioning into the power EGR mode. If the engine power demand is further below the first engine power threshold, the engine is further transitioned out of the power EGR mode (and into the stoichiometric mode), as generally shown by a dotted arrow 622. For example, the EGR rate is gradually decreased, in the direction of dotted arrow 622, over a plurality of engine cycles, as elaborated above with respect to 536 of FIG. 5, until the EGR rate is equal to zero. It may be understood that engine operation in the stoichiometric mode is not illustrated in graph 600, as EGR may not be used to increase engine power in the stoichiometric mode.

Turning now to FIG. 7, an example timeline 700 shows transitioning an engine between different operating modes responsive to a changing engine torque demand. The engine may be engine 10 included in any of the engine system configurations shown in FIGS. 2-4, for example, that enable recirculation of enriched EGR during split lambda operation for further increased engine power. The engine torque demand is shown in plot 702, a boost pressure provided by a turbocharger is shown in plot 704, an operating mode is shown in plot 706, a lambda split is shown in plot 708, an EGR rate is shown in plot 710, an exhaust temperature is shown in plot 712, a delivered spark timing advance of a first set of engine cylinders is shown in plot 714, and a delivered spark timing advance of a second set of engine cylinders is shown in dashed plot 716. Further, a first, lower engine torque threshold is shown by dashed line 720, a second, higher engine torque threshold is shown by dashed line 722, a temperature-limited boost pressure threshold is shown by dashed line 724, a threshold EGR rate is shown by dashed line 726, and a threshold exhaust temperature is shown by dashed line 728.

For all of the above, the horizontal axis represents time, with time increasing along the horizontal axis from left to right. The vertical axis represents each labeled parameter. For plots 702, 704, 708, 710, 712, 714, and 716, a magnitude of the parameter increases up the vertical axis from bottom to top. For plot 706, the vertical axis shows whether the engine is operating in a stoichiometric mode ("stoich"), a power EGR mode ("power EGR"), or a split lambda mode ("split lambda"), as labeled, which correspond to the stoichiometric mode, the power EGR mode, and the split lambda mode described above with respect to FIG. 5. Further, the boost pressure may be understood to include intake manifold pressures that are greater than atmospheric pressure. For example, when the boost pressure is zero, the engine may be operating without boost (e.g., via natural aspiration), such as at lower engine speeds and loads. Additionally, the example of timeline 700 does not show response delays, such as a delay between a request for increased engine torque and a corresponding increase in the boost pressure. Further, spark timings for two cylinder sets are shown, corresponding to an engine having an even number of cylinders (e.g., as in engine system 200 of FIG. 2 and engine system 300 of FIG. 3). However, when the engine instead includes an odd number of cylinders (e.g., as in engine system 400 of FIG. 4), the spark timing for a third cylinder set also may be included.

Prior to time t1, the engine torque demand (plot 702) is less than the first threshold torque (dashed line 720). As a result, the engine is operated in the stoichiometric mode (plot 706), with a lambda split of zero (plot 708). While the engine is operated in the stoichiometric mode, both the EGR rate (plot 710) and the boost pressure (plot 704) are adjusted based on the engine torque demand. For example, when the engine torque demand (plot 702) is low, such as when the engine is operated at idle, EGR is not provided, and the EGR rate is zero. To maintain the EGR rate at zero, an EGR valve (e.g., EGR valve 54 of FIGS. 2-4) is held at a fully closed position. Then, as the engine torque demand increases, the EGR rate is increased from zero (plot 710) by increasing an opening of the EGR valve from the fully closed position. As the engine torque demand further increases and begins to approach the first threshold torque (dashed line 720), the EGR rate is again decreased to zero (plot 710) by decreasing the opening of the EGR valve until the EGR valve is fully closed. Similarly, when the engine torque demand (plot 702) is low, boost may not be provided, with a boost pressure of zero (plot 704). The boost pressure (plot 704) is increased as the engine torque demand increases (plot 702) in order to provide compressed air to meet the increased engine torque demand. Further, the delivered spark timing is the same for the first cylinder set and the second cylinder set (e.g., solid plot 714 and dashed plot 716 are overlapping) due to engine operation with a uniform AFR (e.g., stoichiometry) and varies based on, for example, engine speed and load.

As the EGR rate (plot 710) is decreased and the boost pressure (plot 704) is increased, the exhaust temperature increases (plot 712) and approaches the threshold exhaust temperature (dashed line 728). At temperatures above the threshold exhaust temperature, heat-related degradation of exhaust components, such as a turbine of the turbocharger and an emission control device, may occur. This corresponds to the boost pressure (plot 704) approaching the temperature-limited boost pressure threshold (dashed line 724). The temperature-limited boost pressure threshold corresponds to a maximum amount of boost that may be provided while operating in the stoichiometric mode (plot 706) in order to maintain the exhaust temperature (plot 712) below the threshold exhaust temperature (dashed line 728). Because the boost is limited by the exhaust temperature, the amount of torque the engine can produce while operating in the stoichiometric mode is also limited to below the first threshold torque (dashed line 720).

At time t1, responsive to the engine torque demand (plot 702) surpassing the first threshold torque (dashed line 720), the engine is transitioned to the power EGR mode (plot 706) in order to provide exhaust temperature relief via cooled EGR. Thus, the EGR rate (plot 710) is gradually increased from zero (e.g., by gradually opening the EGR valve from the fully closed position). All of the engine cylinders continue to be operated at stoichiometry in the power EGR mode, and so the lambda split remains equal to zero (plot 708). The spark timing for each cylinder is operated at MBT timing due to the cooling effect of the EGR and may be approximately the same for each cylinder set due to the uniform commanded AFR (plots 714 and 716). Additionally, due to the cooling effect of the EGR, the boost pressure (plot 704) is further increased above the temperature-limited boost pressure threshold (dashed line 724), enabling the engine torque to meet the engine torque demand while the exhaust temperature (plot 712) decreases from and remains below the exhaust temperature threshold (dashed line 728). By maintaining all of the cylinders at stoichiometry, the emission control device continues to efficiently treat exhaust gas, resulting in decreased vehicle emissions, while the engine torque is increased and engine vibrations are minimized.

Between time t1 and time t2, the engine torque demand (plot 702) remains greater than the first threshold torque (dashed line 720) and less than the second threshold torque (dashed line 722). Therefore, the engine is operated in the power EGR mode (plot 706) between time t1 and time t2. Further, the EGR rate (plot 710) and the boost pressure (plot 704) are adjusted based on the engine torque demand (plot 702), such as by decreasing the EGR rate and the boost pressure responsive to the engine torque demand decreasing while remaining between the first threshold torque and the second threshold torque.

At time t2, the engine torque demand (plot 702) decreases below the first threshold torque (dashed line 720). In response, the engine is transitioned out of the power EGR mode and into the stoichiometric mode (plot 706). To transition the engine out of the power EGR mode, the EGR rate is gradually decreased to zero (plot 710), enabling the exhaust temperature (plot 712) to remain below the threshold exhaust temperature (dashed line 728). At the same time, the boost pressure (plot 704) is decreased below the temperature-limited boost pressure threshold (dashed line 724). Upon transitioning out of the power EGR mode and into the stoichiometric mode, the engine is operated in the stoichiometric mode (plot 706) while the engine torque demand (plot 702) remains below the first threshold torque (dashed line 720) between time t2 and time t3. Additionally, with the engine operating in the stoichiometric mode, the lambda split remains at zero (plot 708).

At time t3, the engine torque demand (plot 702) again increases above the first threshold torque (dashed line 720). In response, the engine begins transitioning into the power EGR mode (plot 706), with the EGR rate gradually increased from zero (plot 710). While this transition is occurring, the engine torque demand (plot 702) continues to increase and surpasses the second torque demand threshold (dashed line 722). Thus, the engine transitions into the split lambda mode (plot 706). For example, once the EGR rate (plot 710) reaches the threshold EGR rate (dashed line 726), the EGR rate is gradually decreased while the lambda split (plot 708) is gradually increased. The first set of cylinders is operated at a rich AFR and the second set of cylinders is operated at a lean AFR, with a degree of enrichment of the rich AFR gradually increased as the lambda split is phased in and the lean AFR adjusted accordingly to produce a stoichiometric exhaust mixture at the emission control device. Further, the spark timing advance is adjusted differently for the different cylinder sets. The delivered spark timing advance is lower for the first, rich cylinder set (plot 714) and higher for the second, lean cylinder set (plot 716), although both cylinder sets may be operated at MBT timing (or, alternatively, borderline spark timing) for the corresponding cylinder set.

While the engine is operated in the split lambda mode, the boost pressure (plot 704) is increased above the temperature-limited boost pressure threshold (dashed line 724), enabling the engine torque to meet the engine torque demand while the exhaust temperature (plot 712) remains below the exhaust temperature threshold (dashed line 728). Further, the lambda split and/or the EGR rate may be adjusted based on the engine torque demand, such as by decreasing the lambda split and/or the EGR rate in response to a decreased engine torque demand (that remains above the second threshold torque) and increasing the lambda split and/or the EGR rate in response to an increased engine torque demand. As shown between time t3 and time t4, when the lambda split (plot 708) is relatively high, the EGR rate (plot 710) is held relatively constant, even while there are slight fluctuations in engine torque demand (plot 702).

At time t4, the engine torque demand (plot 702) decreases below the second threshold torque (dashed line 722). As a result, the engine is transitioned out of the split lambda mode and into the power EGR mode. Transitioning out of the split lambda mode and into the power EGR mode includes gradually increasing the EGR rate (plot 710) over a plurality of engine cycles until the threshold EGR rate (dashed line 726) is reached. Further, the lambda split (plot 708) is decreased over the plurality of engine cycles until the engine is operated with a uniform AFR and the lambda split reaches zero. Due to the decreased engine torque demand, the boost pressure is decreased (plot 704) but remains above the temperature-limited boost pressure threshold (dashed line 724). Due to the gradual decrease of the lambda split and the gradual increase of the EGR rate during the transition, the exhaust temperature (plot 712) remains below the exhaust temperature threshold (dashed line 728). Further, each cylinder set is operated with approximately the same delivered spark timing advance (plots 714 and 716) due to transitioning to a uniform commanded AFR.

Following the transition out of the split lambda operating mode, the engine torque demand (plot 702) remains above the first torque threshold (dashed line 720). Therefore, the engine is operated in the power EGR mode (plot 706). However, the engine torque demand (plot 702) then decreases below the first torque threshold (dashed line 720) at time t5, and so the engine is transitioned out of the power EGR mode and into the stoichiometric mode (plot 706). This includes gradually decreasing the EGR rate until the EGR rate reaches zero (plot 710). The boost pressure (plot 704) is decreased below the temperature-limited boost pressure threshold (dashed line 724) so that the exhaust temperature (plot 712) remains below the threshold exhaust temperature (dashed line 728). Further still, the lambda split remains at zero (plot 708).

At time t6, the engine torque demand (plot 702) again increases above the first torque threshold (dashed line 720). In response, the engine is transitioned to operating in the power EGR mode (plot 706), with the EGR rate gradually increased from zero (plot 710) while the lambda split remains at zero (plot 708). Due to the cooling effect of the EGR, the boost pressure (plot 704) is increased above the temperature-limited boost pressure threshold (dashed line 724), enabling the engine torque to meet the higher engine torque demand while the exhaust temperature (plot 712) remains below the exhaust temperature threshold (dashed line 728). The spark timing for each cylinder is also further advanced compared to spark timing outside of the power EGR mode for the same engine speed and load (plots 714 and 716).

The engine is operated in the power EGR mode between time t6 and time t7. However, at time t7, the engine torque demand (plot 702) increases above the second torque threshold (dashed line 722). In response, the engine is transitioned to operating in the split lambda mode (plot 706). During the transitioning, the EGR rate (plot 710) is gradually increased to the threshold EGR rate (dashed line 726) and then gradually decreased while the lambda split (plot 708) is gradually increased. The first set of cylinders is operated at a rich AFR and the second set of cylinders is operated at a lean AFR, with the degree of enrichment of the rich AFR (and the degree of enleanment of the lean AFR) gradually increased as the lambda split is phased in. The third set of cylinders (when the engine includes an odd number of cylinders) is maintained at stoichiometry. Further, the spark timing advance is adjusted differently for the different cylinder sets, as described above with respect to the split lambda transition between time t3 and time t4. While the engine is operated in the split lambda mode, the boost pressure (plot 704) is still further increased above the temperature-limited boost pressure threshold (dashed line 724), enabling the engine torque to meet the engine torque demand while the exhaust temperature (plot 712) remains below the exhaust temperature threshold (dashed line 728).

At time t8, the engine torque demand (plot 702) decreases below the second torque threshold (dashed line 722), and so the engine is transitioned out of the split lambda mode, with the EGR rate (plot 710) gradually increased over a plurality of engine cycles until the threshold EGR rate (dashed line 726) is reached. However, during the transition out of the split lambda mode, the engine torque demand (plot 702) continues to decrease and decreases below the first torque threshold (dashed line 720). Thus, the engine transitions into the stoichiometric mode (plot 706), and the power EGR mode serves as a transitory mode during the transition between the split lambda mode and the stoichiometric mode. Further, the lambda split (plot 708) is decreased over the plurality of engine cycles until the engine is operated with a uniform AFR and the lambda split reaches zero, and then the EGR rate is decreased to zero (plot 710). Due to the decreased engine torque demand and also due to cooling EGR and enrichment not being provided, the boost pressure is decreased (plot 704) below the temperature-limited boost pressure threshold (dashed line 724). Due to the gradual decrease of the lambda split and the gradual increase of the EGR rate during the transition, the exhaust temperature (plot 712) remains below the exhaust temperature threshold (dashed line 728).

In this way, an engine of a vehicle may be configured to flow EGR from a specific subset of cylinders and may be operated in different operating modes (e.g., a stoichiometric mode, a power EGR mode, and a split lambda mode) based on an engine torque (or power) demand. In particular, operating in the power EGR mode and the split lambda mode enable engine airflow, and thus engine power, to be increased while reducing heat-related exhaust component degradation. Further, increasing engine power via the power EGR mode and via the split lambda mode increases engine power while reducing vehicle emissions compared with conventional enrichment strategies. Additionally, the split lambda operating mode is enhanced via enriched EGR, which enables further spark timing advancements for additional power gains. Further still, vibrations due to imbalance between rich and lean cylinders while operating in the split lambda mode may be reduced by transitioning through the power EGR mode, which includes phasing in EGR, and then phasing out EGR while phasing in a lambda split.

The technical effect of partially enriching an engine while maintaining the engine at global stoichiometry and recirculating enriched EGR is that engine power may be increased without increasing vehicle emissions.

The technical effect of gradually increasing an EGR rate to increase engine power and then gradually decreasing the EGR rate while increasing an air-fuel ratio difference between two groups of cylinders to further increase the engine power, the air-fuel ratio difference providing partial engine enrichment while maintaining the engine at global stoichiometry, is that engine vibrations may be reduced while exhaust component temperatures are maintained below an upper threshold.

As one example, a method, comprises: responsive to an engine load reaching a threshold load, increasing engine torque by increasing an amount of boost without providing exhaust gas recirculation (EGR) until reaching a first threshold torque; and responsive to the engine torque reaching the first threshold torque, increasing the engine torque by increasing an EGR rate over a plurality of engine cycles while further increasing the amount of boost. In the preceding example, additionally or optionally, increasing the amount of boost includes increasing an intake compressor speed, and the method further comprises maintaining a stoichiometric air-fuel ratio (AFR) while increasing the amount of boost. In one or both of the preceding examples, the method additionally or optionally further comprises, responsive to the engine torque reaching a second threshold torque, greater than the first threshold torque, decreasing the EGR rate to a non-zero rate while increasing a lambda split between a first set of one or more engine cylinders and a second set of one or more engine cylinders over a plurality of engine cycles. In any or all of the preceding examples, the method additionally or optionally further comprises further increasing the amount of boost while increasing the lambda split between the first set of one or more engine cylinders and the second set of one or more engine cylinders. In any or all of the preceding examples, the method additionally or optionally further comprises adjusting a spark timing individually for the first set of one or more engine cylinders and the second set of one or more engine cylinders. In any or all of the preceding examples, additionally or optionally, the lambda split is a difference between a first AFR of the first set of one or more engine cylinders and a second AFR of the second set of one or more engine cylinders. In any or all of the preceding examples, additionally or optionally, the first AFR is a rich AFR and the second AFR is a lean AFR, and increasing the lambda split between the first set of one or more engine cylinders and the second set of one or more engine cylinders includes increasing a degree of enrichment of the first AFR and increasing a degree of enleanment of the second AFR. In any or all of the preceding examples, additionally or optionally, the EGR is selectively drawn from the first set of one or more cylinders, and the degree of enrichment is equal to the degree of enleanment. In any or all of the preceding examples, additionally or optionally, the first set of one or more engine cylinders includes a first half of the engine cylinders and the second set of one or more engine cylinders includes a second, remaining half of the engine cylinders. In any or all of the preceding examples, additionally or optionally, a third set of one or more engine cylinders is equal operated with a stoichiometric AFR. In any or all of the preceding examples, additionally or optionally, the first threshold torque is set based on a threshold exhaust temperature, and the method further comprises: prior to the engine load reaching the threshold load, increasing engine torque by increasing the amount of boost while adjusting EGR based on the engine load.

As another example, a method comprises: transitioning an engine between a stoichiometric mode, a power exhaust gas recirculation (EGR) mode, and a split lambda mode based on engine demand, including transitioning the engine from operating in the the stoichiometric mode to the power EGR mode responsive to engine demand increasing above a first, lower threshold and transitioning the engine from operating in the power EGR mode to operating in the split lambda mode responsive to the engine demand further increasing above a second, higher threshold. In the previous example, additionally or optionally, transitioning the engine from operating in the stoichiometric mode to operating in the power EGR mode includes: increasing an EGR rate from zero while maintaining an air-fuel ratio for all cylinders of the engine at stoichiometry; and advancing a spark timing based on the EGR rate. In one or both of the previous examples, additionally or optionally, transitioning the engine from operating in the power EGR mode to operating in the split lambda mode includes: first increasing the EGR rate to a threshold EGR rate, then decreasing the EGR rate from the threshold EGR rate; while decreasing the EGR rate from the threshold EGR rate, increasing an air-fuel ratio difference between a first set of cylinders and a second set of cylinders, the first set of cylinders and the second set of cylinders including a same number of cylinders and producing stoichiometric exhaust gas at a downstream emission control device; and individually adjusting the spark timing for each cylinder based on the EGR rate and the air-fuel ratio of the cylinder. In any or all of the preceding examples, additionally or optionally, increasing the air-fuel ratio difference between the first set of cylinders and the second set of cylinders includes increasing a degree of enrichment of the first set of cylinders and increasing a degree of enleanment of the second set of cylinders by a corresponding amount, and wherein EGR is drawn from the first set of cylinders only. In any or all of the preceding examples, additionally or optionally, transitioning the engine between the stoichiometric mode, the power EGR mode, and the split lambda mode based on engine demand further includes: transitioning the engine from operating in the split lambda mode to operating in the power EGR mode responsive to the engine demand decreasing below the second threshold; and transitioning the engine from operating in the power EGR mode to operating in the stoichiometric mode responsive to the engine demand further decreasing below the first threshold.

As another example, a system comprises: an engine, including a plurality of cylinders; an exhaust gas recirculation (EGR) passage positioned to route a portion of exhaust gas from the engine to an intake passage of the engine; a turbocharger, including a turbine coupled to an exhaust passage and a compressor coupled to the intake passage; an emission control device coupled to the exhaust passage downstream of the turbine; and a controller with computer readable instructions stored on non-transitory memory that, when executed during engine operation, cause the controller to: increase engine power output by increasing an amount of boost provided by the turbocharger while providing EGR until engine load reaches a threshold engine load; responsive to the engine load reaching the threshold engine load, increase the engine power output by increasing the amount of boost provided by the turbocharger without providing EGR until a first power threshold is reached; and responsive to the engine power output reaching the first power threshold, increase the engine power output by increasing the amount of boost provided by the turbocharger while increasing an amount of the EGR. In the preceding example, additionally or optionally, the controller includes further computer readable instructions stored on non-transitory memory that, when executed during engine operation, cause the controller to: responsive to the engine power output reaching a second power threshold, greater than the first power threshold, increase the engine power output by operating a first set of the plurality of cylinders at a rich air-fuel ratio and a second set of the plurality of cylinders at a lean air-fuel ratio, a difference between the rich air-fuel ratio and the lean air-fuel ratio increased over a plurality of engine cycles as the amount of EGR is decreased over the plurality of engine cycles. In one or both of the preceding examples, additionally or optionally, the first set of cylinders is coupled to a first exhaust manifold, the second set of cylinders is coupled to a second exhaust manifold, separate from the first exhaust manifold upstream of the turbine; exhaust gas from the first set of cylinders and the second set of cylinders mixes in the exhaust passage to produce a stoichiometric air-fuel ratio at the emission control device; and the EGR passage is coupled between the first exhaust manifold and the intake passage. In any or all of the preceding examples, additionally or optionally, an exhaust runner of one or more cylinders of the first set of cylinders is coupled to the EGR passage; and the rich air-fuel ratio and the lean air-fuel ratio are selected to produce a stoichiometric air-fuel ratio at the emission control device.

In another representation, a method for an engine comprises: increasing an exhaust gas recirculation (EGR) rate as a request for engine torque increases; responsive to the request for engine torque surpassing a threshold, enriching a first set of cylinders and enleaning a second set of cylinders, a degree of the enriching and the enleaning increasing as the request for engine torque increases; and decreasing the EGR rate as the degree of the enriching and the enleaning increases. In the preceding example, additionally or optionally, exhaust gas from the first set and the second set of cylinders produces a stoichiometric air-fuel ratio at a downstream catalyst. In one or both of the preceding examples, additional or optionally, the EGR is provided from the first set of cylinders and not the second set of cylinders. In any or all of the preceding examples, the method additionally or optionally further comprises optimizing spark timing individually for the first set of cylinders and the second set of cylinders, including operating the first set of cylinders at a first MBT timing and operating the second set of cylinders at a second, different MBT timing, the first MBT timing less advanced than the second MBT timing. In any or all of the preceding examples, additionally or optionally, the first set of cylinders includes a first half of a total number of engine cylinders and the second set of cylinders includes a second half of the total number of engine cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
operating an engine at a first time that includes an engine load reaching a threshold load;
responsive to the engine load reaching the threshold load at the first time, increasing engine torque by increasing an amount of boost without exceeding a temperature- limited boost pressure threshold and without providing exhaust gas recirculation (EGR) until reaching a first threshold torque;

operating the engine with the engine torque reaching the first threshold torque at a second time; and responsive to the engine torque reaching the first threshold torque at the second time, increasing the engine torque by increasing an EGR rate over a plurality of engine cycles while further increasing the amount of boost above the temperature-limited boost pressure threshold.

2. The method of claim 1, wherein increasing the amount of boost includes increasing an intake compressor speed, and the method further comprises maintaining a stoichiometric air-fuel ratio (AFR) in the engine while increasing the amount of boost responsive to the engine load reaching the threshold load at the first time and also responsive to the engine torque reaching the first threshold torque at the second time.

3. The method of claim 1, further comprising:
operating the engine at a third time that includes the engine torque reaching a second threshold torque, greater than the first threshold torque; and
responsive to the engine torque reaching the second threshold torque at the third time, decreasing the EGR rate to a non-zero rate while increasing a lambda split between a first set of one or more engine cylinders and a second set of one or more engine cylinders over a plurality of engine cycles.

4. The method of claim 3, further comprising, further increasing the amount of boost above the temperature-limited boost pressure threshold while increasing the lambda split between the first set of one or more engine cylinders and the second set of one or more engine cylinders.

5. The method of claim 3, further comprising adjusting a spark timing individually for the first set of one or more engine cylinders and the second set of one or more engine cylinders.

6. The method of claim 3, wherein the lambda split is a difference between a first AFR of the first set of one or more engine cylinders and a second AFR of the second set of one or more engine cylinders.

7. The method of claim 6, wherein the first AFR is a rich AFR and the second AFR is a lean AFR, and increasing the lambda split between the first set of one or more engine cylinders and the second set of one or more engine cylinders includes increasing a degree of enrichment of the first AFR and increasing a degree of enleanment of the second AFR.

8. The method of claim 7, wherein the EGR is selectively drawn from the first set of one or more cylinders, and the degree of enrichment is equal to the degree of enleanment.

9. The method of claim 7, wherein the first set of one or more engine cylinders includes a first half of the engine cylinders and the second set of one or more engine cylinders includes a second, remaining half of the engine cylinders.

10. The method of claim 7, wherein a third set of one or more engine cylinders is equal operated with a stoichiometric AFR.

11. The method of claim 1, further comprising:
setting the first threshold torque is set based on a threshold exhaust temperature; and
prior to the engine load reaching the threshold load, increasing the engine torque by increasing the amount of boost while adjusting the EGR based on the engine load.

12. A method, comprising:
transitioning an engine between a stoichiometric mode, a power exhaust gas recirculation (EGR) mode, and a split lambda mode based on an engine demand, including transitioning the engine from operating in the stoichiometric mode to the power EGR mode responsive to the engine demand increasing above a first, lower threshold and transitioning the engine from operating in the power EGR mode to operating in the split lambda mode responsive to the engine demand further increasing above a second, higher threshold, the transitioning the engine from operating in the power EGR mode to operating in the split lambda mode including:
first increasing an EGR rate to a threshold EGR rate, then decreasing the EGR rate from the threshold EGR rate;
while decreasing the EGR rate from the threshold EGR rate, increasing an air-fuel ratio difference between a first set of cylinders and a second set of cylinders, the first set of cylinders and the second set of cylinders including a same number of cylinders and producing stoichiometric exhaust gas at a downstream emission control device; and
individually adjusting a spark timing for each cylinder based on the EGR rate and an air-fuel ratio of the cylinder.

13. The method of claim 12, wherein transitioning the engine from operating in the stoichiometric mode to operating in the power EGR mode includes:
increasing the EGR rate from zero while maintaining the air-fuel ratio for all cylinders of the engine at stoichiometry; and
advancing the spark timing based on the EGR rate.

14. The method of claim 12, wherein increasing the air-fuel ratio difference between the first set of cylinders and the second set of cylinders includes increasing a degree of enrichment of the first set of cylinders and increasing a degree of enleanment of the second set of cylinders by a corresponding amount, and wherein EGR is drawn from the first set of cylinders only.

15. The method of claim 12, wherein transitioning the engine between the stoichiometric mode, the power EGR mode, and the split lambda mode based on the engine demand further includes:
transitioning the engine from operating in the split lambda mode to operating in the power EGR mode responsive to the engine demand decreasing below the second threshold; and
transitioning the engine from operating in the power EGR mode to operating in the stoichiometric mode responsive to the engine demand further decreasing below the first threshold.

16. A system, comprising:
an engine, including a plurality of cylinders;
an exhaust gas recirculation (EGR) passage positioned to route a portion of exhaust gas from the engine to an intake passage of the engine;
a turbocharger, including a turbine coupled to an exhaust passage and a compressor coupled to the intake passage;
an emission control device coupled to the exhaust passage downstream of the turbine; and
a controller with computer readable instructions stored on non-transitory memory that, when executed during engine operation, cause the controller to:

increase engine power output by increasing an amount of boost provided by the turbocharger while providing EGR until engine load reaches a threshold engine load;

responsive to the engine load reaching the threshold engine load, increase the engine power output by increasing the amount of boost provided by the turbocharger without exceeding a temperature-limited boost pressure threshold and without providing EGR until a first power threshold is reached; and responsive to the engine power output reaching the first power threshold, increase the engine power output by increasing the amount of boost provided by the turbocharger above the temperature-limited boost pressure threshold while increasing an amount of the EGR.

17. The system of claim 16, wherein the controller includes further computer readable instructions stored on non-transitory memory that, when executed during engine operation, cause the controller to:

responsive to the engine power output reaching a second power threshold, greater than the first power threshold, increase the engine power output by operating a first set of the plurality of cylinders at a rich air-fuel ratio and a second set of the plurality of cylinders at a lean air-fuel ratio, a difference between the rich air-fuel ratio and the lean air-fuel ratio increased over a plurality of engine cycles as the amount of EGR is decreased over the plurality of engine cycles.

18. The system of claim 17, wherein:

the first set of the plurality of cylinders is coupled to a first exhaust manifold, the second set of the plurality of cylinders is coupled to a second exhaust manifold, separate from the first exhaust manifold upstream of the turbine;

exhaust gas from the first set of the plurality of cylinders and the second set of the plurality of cylinders mixes in the exhaust passage to produce a stoichiometric air-fuel ratio at the emission control device; and the EGR passage is coupled between the first exhaust manifold and the intake passage.

19. The system of claim 17, wherein:

an exhaust runner of one or more cylinders of the first set of the plurality of cylinders is coupled to the EGR passage; and the rich air-fuel ratio and the lean air-fuel ratio are selected to produce a stoichiometric air-fuel ratio at the emission control device.

* * * * *